US012546907B2

(12) United States Patent
Nandagopala Krishnan et al.

(10) Patent No.: US 12,546,907 B2
(45) Date of Patent: Feb. 10, 2026

(54) NEUTRON DETECTORS AND METHODS OF FABRICATING THE SAME USING BORON AS NEUTRON CONVERSION LAYER AND CONFORMAL DOPING SOURCE

(71) Applicant: Board of Regents, The University of Texas System, Austin, TX (US)

(72) Inventors: Siddartha Srinivasan Nandagopala Krishnan, Plano, TX (US); Jesus Alfonso Caraveo Frescas, Richardson, TX (US); Carlos Hugo Avila-Avendano, Dallas, TX (US); Manuel Quevedo Lopez, Richardson, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 265 days.

(21) Appl. No.: 17/759,802

(22) PCT Filed: Jan. 29, 2021

(86) PCT No.: PCT/US2021/015782
§ 371 (c)(1),
(2) Date: Jul. 29, 2022

(87) PCT Pub. No.: WO2021/155202
PCT Pub. Date: Aug. 5, 2021

(65) Prior Publication Data
US 2023/0065803 A1 Mar. 2, 2023

(51) Int. Cl.
G01T 3/08 (2006.01)
H10F 30/295 (2025.01)
(Continued)

(52) U.S. Cl.
CPC .............. *G01T 3/08* (2013.01); *H10F 30/295* (2025.01); *H10F 71/121* (2025.01); *H10F 77/1223* (2025.01); *H10F 77/148* (2025.01)

(58) Field of Classification Search
None
See application file for complete search history.

(56) References Cited

U.S. PATENT DOCUMENTS 5,880,471 A * 3/1999 Schelten .................... G01T 3/08
257/E31.086
7,164,138 B2 * 1/2007 McGregor ................ G01T 3/00
250/390.01
(Continued)

FOREIGN PATENT DOCUMENTS

WO 2007/109535 9/2007
WO 2016/053413 4/2016

OTHER PUBLICATIONS

R. C. Runkle, et al., Securing special nuclear material: Recent advances in neutron detection and their role in nonproliferation, J. Appl. Phys. 108, 111101 (2010), 22 pages.
(Continued)

Primary Examiner — David P Porta
Assistant Examiner — Djura Malevic
(74) Attorney, Agent, or Firm — SALIWANCHIK, LLOYD & EISENSCHENK

(57) ABSTRACT

Thermal neutron detectors and methods of fabricating the same are provided. A thermal neutron detector can use boron in both the neutron conversion layer and as a source for conformal doping in a semiconductor substrate. The neutron detector can be a micro-structured diode with cavities having a depth of 60 microns or less. The boron can be filled in the cavities and diffused into the semiconductor substrate via a diffusion annealing process.

21 Claims, 17 Drawing Sheets

(51) Int. Cl.
    *H10F 71/00*     (2025.01)
    *H10F 77/1223*     (2025.01)
    *H10F 77/14*     (2025.01)

(56) References Cited

U.S. PATENT DOCUMENTS

| | | | | |
|---|---|---|---|---|
| 7,855,372 | B2* | 12/2010 | McGregor | G01T 3/08 |
| | | | | 250/370.05 |
| 8,310,021 | B2* | 11/2012 | Larsen | H10F 71/139 |
| | | | | 257/E31.086 |
| 8,778,715 | B2* | 7/2014 | Bellinger | H01L 31/18 |
| | | | | 438/700 |
| 9,081,100 | B1* | 7/2015 | Bellinger | G01T 3/085 |
| 9,151,853 | B2* | 10/2015 | Dahal | H10F 71/00 |
| 9,406,833 | B2* | 8/2016 | Dahal | H10F 30/29 |
| 9,490,318 | B2* | 11/2016 | Voss | H01L 21/02107 |
| 9,595,628 | B1* | 3/2017 | Okandan | H10F 77/1228 |
| 9,645,262 | B2* | 5/2017 | Shao | H10F 30/29 |
| 9,810,794 | B2* | 11/2017 | Dahal | H01L 31/18 |
| 10,107,924 | B2* | 10/2018 | Bellinger | G01T 3/08 |
| 10,383,520 | B2* | 8/2019 | Wojtczuk | H01L 31/02162 |
| 10,568,514 | B2* | 2/2020 | Wojtczuk | H01L 31/03046 |
| 10,658,145 | B2* | 5/2020 | Yun | H01J 35/12 |
| 10,896,823 | B2* | 1/2021 | Seidel | H01L 21/31122 |
| 11,103,134 | B2* | 8/2021 | Wojtczuk | H10F 77/331 |
| 11,163,230 | B2* | 11/2021 | Verschuuren | C08L 83/04 |
| 11,175,243 | B1* | 11/2021 | Yun | G01N 23/04 |
| 11,387,438 | B2* | 7/2022 | Watkins | H01M 4/622 |
| 11,522,099 | B2* | 12/2022 | Cao | H10F 30/301 |
| 11,677,041 | B2* | 6/2023 | Dahal | H01L 31/1856 |
| | | | | 257/429 |
| 11,764,057 | B2* | 9/2023 | Liu | H01L 21/02428 |
| | | | | 257/49 |
| 11,837,624 | B2* | 12/2023 | Cao | H01L 27/14696 |
| 11,850,024 | B2* | 12/2023 | Wojtczuk | A61B 5/0059 |
| 2005/0258372 | A1* | 11/2005 | McGregor | G01T 3/08 |
| | | | | 250/390.01 |
| 2007/0166984 | A1* | 7/2007 | Kim | H01L 21/76801 |
| | | | | 438/597 |
| 2009/0302231 | A1* | 12/2009 | McGregor | G01T 3/08 |
| | | | | 257/E31.001 |
| 2010/0323508 | A1* | 12/2010 | Adibi | C23C 14/042 |
| | | | | 438/513 |
| 2011/0012222 | A1* | 1/2011 | Cho | H10F 77/123 |
| | | | | 257/E31.043 |
| 2012/0132819 | A1* | 5/2012 | Climent | G01V 5/107 |
| | | | | 250/370.05 |
| 2012/0235260 | A1* | 9/2012 | Nikolic | G01T 3/08 |
| | | | | 257/429 |
| 2012/0313196 | A1* | 12/2012 | Li | H10F 77/148 |
| | | | | 257/E31.124 |
| 2013/0075848 | A1* | 3/2013 | Nikolic | H10F 30/301 |
| | | | | 438/37 |
| 2013/0082241 | A1* | 4/2013 | Kub | H10F 77/122 |
| | | | | 257/E31.005 |
| 2013/0187056 | A1* | 7/2013 | Nikolic | G01T 3/008 |
| | | | | 427/230 |
| 2013/0334541 | A1* | 12/2013 | Voss | H10D 62/117 |
| | | | | 257/77 |
| 2013/0344636 | A1* | 12/2013 | Bellinger | H10F 30/29 |
| | | | | 977/773 |
| 2014/0252520 | A1* | 9/2014 | Dahal | H01L 31/03529 |
| | | | | 257/429 |
| 2015/0380593 | A1* | 12/2015 | Dahal | H01L 31/03529 |
| | | | | 438/56 |
| 2016/0356901 | A1* | 12/2016 | Shao | G01T 3/08 |
| 2017/0010370 | A1* | 1/2017 | Bellinger | G01T 3/08 |
| 2017/0133543 | A1* | 5/2017 | Dahal | H01L 21/02562 |
| 2017/0139060 | A1* | 5/2017 | Dahal | G01T 1/24 |
| 2020/0357997 | A1* | 11/2020 | Moddel | H02N 11/002 |
| 2023/0065803 | A1* | 3/2023 | Nandagopala Krishnan | |
| | | | | H01L 31/03529 |

OTHER PUBLICATIONS

Richard T. Kouzes et al., Neutron detection alternatives to 3He for national security applications, Nuclear Instruments and Methods in Physics Research A 623 (2010) 1035-1045, 11 pages.

A N Caruso, The physics of solid-state neutron detector materials and geometries, J. Phys.: Condens. Matter 22 (2010) 443201, 33 pages.

P. Rinard, Neutron Interactions with Matter, Technical Report, Los Alamos National Laboratory, NUREG/CR-5550, 1991, 3 pages.

Q. Shao et al., High aspect ratio composite structures with 48.5% thermal neutron detection efficiency, Appl. Phys. Lett. 102, 063505 (2013), 5 pages.

D. S. McGregor et al., Design considerations for thin film coated semiconductor thermal neutron detectors—I: basics regarding alpha particle emitting neutron reactive films, Nuclear Instruments and Methods in Physics Research A 500 (2003) 272-308, 37 pages.

John W. Murphy et al., Optimizing diode thickness for thin-film solid state thermal neutron detectors, Appl. Phys. Lett. 101, 143506 (2012), 6 pages.

L. Smith et al., Thin film CdTe based neutron detectors with high thermal neutron efficiency and gamma rejection for security applications, Nuclear Instruments and Methods in Physics Research A 838 (2016) 117-123, 7 pages.

Douglas S. McGregor et al., Present status of microstructured semiconductor neutron detectors, Journal of Crystal Growth 379 (2013) 99-110, 12 pages.

R. J. Nikolic et al., Si Pillar Structured Thermal Neutron Detectors: Fabrication Challenges and Performance Expectations, Lawrence Livermore National Laboratory, SPIE Proceedings, LLNL-PROC-4808092011, 13 pages.

J. Uher et al., Characterization of 3D thermal neutron semiconductor detectors, Nuclear Instruments and Methods in Physics Research A 576 (2007) 32-37, 6 pages.

D. S. McGregor et al., Microstructured semiconductor neutron detectors, Nuclear Instruments and Methods in Physics Research A 608 (2009) 125-131, 7 pages.

R. J. Nikolic et al., 6:1 aspect ratio silicon pillar based thermal neutron detector filled with 10B, Appl. Phys. Lett. 93, 133502 (2008), 4 pages.

Baoning Yu et al., Process effects on leakage current of Si-PIN neutron detectors with porous microstructure, Phys. Status Solidi A 214, No. 6, 1600900 (2017), 5 pages.

Jia-Woei Wu et al., Boron-10 nanoparticles filled silicon trenches for thermal neutron detection application, Appl. Phys. Lett. 110, 192105 (2017), 6 pages.

S. L. Bellinger et al., Enhanced variant designs and characteristics of the microstructured solid-state neutron detector, Nuclear Instruments and Methods in Physics Research A 652 (2011) 387-391, 5 pages.

S. L. Bellinger et al., Characteristics of the stacked microstructured solid state neutron detector, Proceedings of SPIE, vol. 7805, 2022, 17 pages.

Ryan G. Fronk et al., Dual-sided microstructured semiconductor neutron detectors (DSMSNDs), Nuclear Instruments and Methods in Physics Research A 804 (2015) 201-206, 6 pages.

Ryan G. Fronk, Dual-side etched microstructured semiconductor neutron detectors, An Abstract of a dissertation, Department of Mechanical and Nuclear Engineering, College of Engineering, Kansas State University, 2017, 196 pages.

R. Dahal et al., Self-powered micro-structured solid state neutron detector with very low leakage current and high efficiency, Appl. Phys. Lett. 100, 243507 (2012), 5 pages.

Douglas S. McGregor et al., Reporting detection efficiency for semiconductor neutron detectors: A need for a standard, Nuclear Instruments and Methods in Physics Research A 632 (2011) 167-174, 8 pages.

J. K. Shultis et al., Design and performance considerations for perforates semiconductor thermal-neutron detectors, Nuclear Instruments and Methods in Physics Research A 606 (2009) 608-636, 29 pages.

(56) References Cited

OTHER PUBLICATIONS

Christopher J. Werner et al., MCNP User's Manual, Code Version 6.2, Los Alamos National Laboratory, Report LA-UR-17-29981 2017, 746 pages.
Christopher J. Werner et al., MCNP Version 6.2 Release Notes, Los Alamos National Laboratory, Report LA-UR-18-20808, 41 pages.
International Search Report/Written Opinion, PCT International Application No. PCT/US2021/015782, mail date Jun. 28, 2021, 17 pages.
Wu Jia-Woei et al., Boron-10 nanoparticles filled silicon trenches for thermal neutron detection application, Applied Physics Letters, vol. 110, No. 19, May 11, 2017, 5 pages.
Dahal et al., Self-powered micro-structured solid state neutron detector with very low leakage current and high efficiency, Applied Physics Letters, vol. 100, No. 24, Jun. 11, 2012, 4 pages.

\* cited by examiner

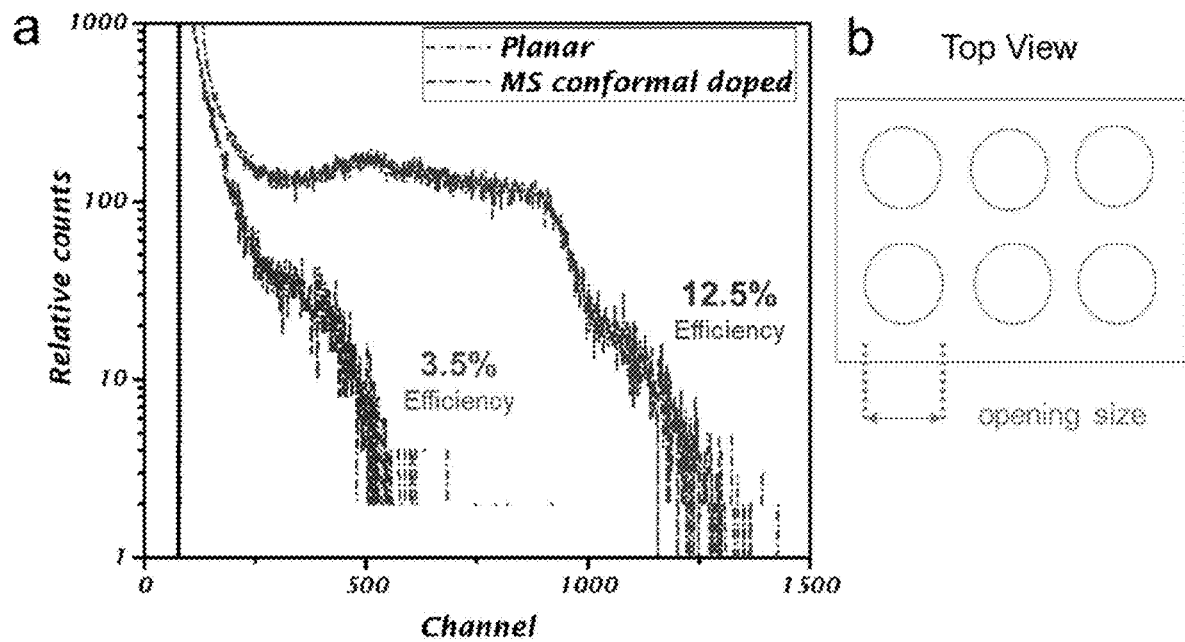
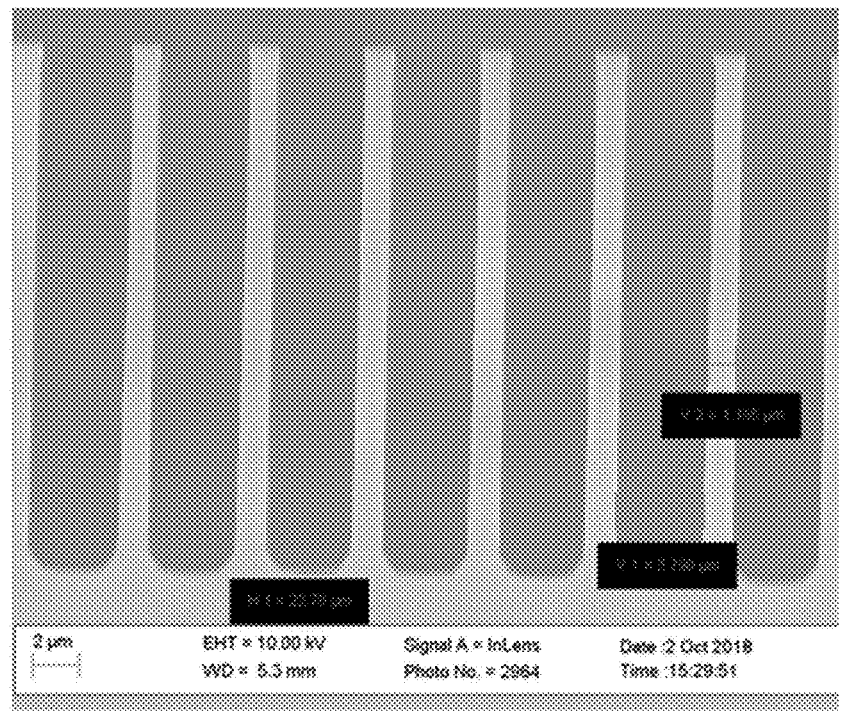
FIGS. 2a-2c

NEUTRON DETECTORS AND METHODS OF FABRICATING THE SAME USING BORON AS NEUTRON CONVERSION LAYER AND CONFORMAL DOPING SOURCE

CROSS-REFERENCE TO RELATED APPLICATIONS

This application is a national stage application of International Patent Application No. PCT/US2021/015782, filed Jan. 29, 2021, which claims the benefit of U.S. Provisional Application Ser. No. 62/968,373, filed Jan. 31, 2020, the disclosures of each of which are incorporated herein by reference in their entirety, including any figures, tables, and drawings.

BACKGROUND

In semiconductor radiation detectors, incident radiation interacts with the detector material to create electron-hole pairs. These generated charges are collected by the respective electrodes thereby creating an electrical pulse, which carries information on the type, energy, time of arrival, and flux of the particles. The most important feature of a semiconductor detector is its superior energy resolution due to a lower ionization potential and compact size that makes semiconductor detectors ideal for use in radiation detection applications. Because the primary ionization must be collected to make a direct measurement of the energy of nuclear radiation, condensed phases with higher densities than gases provide more efficient stopping of radiation particles per unit length. Also, because metals allow for the rapid recombination of generated charges and insulators inhibit the collection of these charges, these are not good candidates for a condensed phase neutron detector, though they could still be used for radiation shielding. For these reasons, semiconductors appear to be the only good option to be extensively used as radiation detectors.

Silicon and germanium are the most commonly used semiconductor materials in solid-state ionization chambers. Semiconductors based on other materials have been studied, but scaling them to commercial applications has proven difficult due to their inherent disadvantages like availability, environmental hazards, and production techniques. Because neutrons do not cause direct ionization of the detector, second order effects must be relied upon. The most common reactions used to create a charged particle from neutron interaction is $^{10}B(n,\alpha)^{7}Li$ and $^{6}Li(n,\alpha)^{3}H$ reactions ([1],[2],[3]). When a thermal neutron collides with the conversion material, it produces primary reaction products such as alphas, gammas, nucleons, and possibly others. As these charged reaction products travel through the detection media, they generate secondary reaction products by ionization, which will eventually contribute to an electrical signal that indicates the detection of thermal neutron. In a typical planar neutron detector, the primary reaction products generated by neutron absorption are alpha particles, which subsequently ionize the semiconductor detector that is typically operated under a reverse bias, generating electron-hole pairs. These generated charges are separated by the applied electric field and collected at the contacts. Solid-state thermal neutron detectors are compact, operate at low voltages, and are more stable against the vibration induced noise when compared to gas-based detectors. Despite these advantages, the maximum detection efficiency of thin-film-coated planar detectors is limited to 5%, as compared to 70% for helium-based gas detectors ([4]).

BRIEF SUMMARY

Embodiments of the subject invention provide novel and advantageous thermal neutron detectors and methods of fabricating the same. A thermal neutron detector can have high detection efficiency enabled by the dual use of isotopically enriched boron (e.g., 10-boron ($^{10}B$) or boron-containing materials (e.g., $^{10}B$-containing materials) in both the neutron conversion layer and as a source for conformal doping. The neutron detector can be a micro-structured diode (e.g., a PIN diode or PN diode), in which cavities are etched in the semiconductor substrate. The cavities can have any suitable type of geometry (e.g., trench, circular hole, square hole, triangular hole) and the cavities can have all the same type of geometry, the cavities can exhibit different types of geometry from other cavities of the diode, some cavities can share geometry with some other cavities and have different geometry from other cavities, or any combination thereof. The cavities can be filled with the enriched boron or boron-containing materials, which can be a powder (e.g., a $^{10}B$ powder, $^{10}B_4C$, $^{10}B_2O_3$, or others). The substrate with the filled cavities can then be thermally treated for the solid-state diffusion of boron into the semiconductor (e.g., silicon or germanium) substrate, giving a continuous, conformal conductive layer, all over the exposed surfaces of the cavities. The cavities can be microstructures with variable depth, with typical depths being 500 micrometers (μm) or less (e.g., 60 μm or less). The boron (e.g., $^{10}B$) filling acts as neutron conversion for the boron (e.g., $^{10}B$) transmutation reaction to occur, releasing alpha particles that are then sensed by the diode (e.g., PIN diode or PN diode). The boron can also be used as source for the solid-state diffusion of boron into silicon, to achieve conformal doping of the micro-structured diodes, thereby greatly enhancing the neutron detection efficiency and dramatically reducing the fabrication complexity of the device.

In an embodiment, a method of fabricating a thermal neutron detector can comprise: performing n-type doping on a first surface of a semiconductor substrate; performing p-type doping on a second surface of the semiconductor substrate using a p-type dopant material, the second surface being opposite from the first surface; etching microstructures in the second surface of the semiconductor substrate; backfilling the p-type dopant material in the microstructures; and performing diffusion annealing on the semiconductor substrate having the p-type dopant material backfilled in the microstructures such that at least one element (e.g., boron) from the p-type dopant material diffuses into the semiconductor substrate. Each microstructure of the microstructures etched in the second surface of the semiconductor substrate can have a depth of 500 μm or less (e.g., 60 μm or less). The method can further comprise, before performing the p-type doping on the second surface of the semiconductor substrate, depositing an insulating layer dielectric on the second surface of the semiconductor substrate to leave an active pattern exposed on the second surface, wherein the p-type doping is performed on the active pattern. The p-type dopant material can comprise boron, though embodiments are not limited thereto. The p-type dopant material can be, for example, a $^{10}B$ powder. In some embodiments, microstructures can also be etched in the first surface of the semiconductor substrate.

In another embodiment, a thermal neutron detector can comprise a semiconductor substrate comprising microstructures on a first surface thereof, wherein the semiconductor substrate comprises: an n-doped section formed by n-type doping on a second surface of the semiconductor substrate, the second surface being opposite from the first surface; and a p-doped section formed by p-type doping on the first surface of the semiconductor substrate using a p-type dopant material. The p-type dopant material can be filled in the microstructures, and it can be the case that diffusion annealing has been performed on the semiconductor substrate having the p-type dopant material backfilled in the microstructures such that at least one element from the p-type dopant material has diffused into the semiconductor substrate through sidewalls of the microstructures. If at least one element (e.g., boron) from the p-type dopant material has diffused into the semiconductor substrate through sidewalls of the microstructures as a result of the diffusion annealing, this results in a structural difference compared to a neutron detector that is not formed this way and leads to a much higher neutron detection efficiency (see also, e.g., FIGS. 6a and 6b). The second surface can also have microstructure in some cases. Each microstructure of the microstructures in the first surface and/or second surface of the semiconductor substrate can have a depth of 500 μm or less (e.g., 60 μm or less). The p-type dopant material can comprise boron, though embodiments are not limited thereto. The p-type dopant material can be, for example, a $^{10}B$ powder.

BRIEF DESCRIPTION OF DRAWINGS

FIG. 2a is a plot of relative counts versus channel, showing a comparison of neutron detection by a planar PIN diode and micro-structured diode. The curve with the higher count values is for the micro-structured diode (12.5% efficiency, compared to 3.5% efficiency for the planar diode).

FIG. 2b shows a top view of geometry used to create microstructures in a micro-structured diode according to an embodiment of the subject invention.

FIG. 2c is a scanning electron microscope (SEM) image showing a cross-sectional view of a micro-structured PIN diode according to an embodiment of the subject invention.

FIGS. 5a-5d show surface treatments in micro-structured diodes to decrease leakage current and their impact on neutron detection efficiency; these figures are from [8].

DETAILED DESCRIPTION

Embodiments of the subject invention provide novel and advantageous thermal neutron detectors and methods of fabricating the same. A thermal neutron detector can have high detection efficiency enabled by the dual use of isotopically enriched boron (e.g., 10-boron ($^{10}$B) or boron-containing materials (e.g., $^{10}$B-containing materials) in both the neutron conversion layer and as a source for conformal doping. The neutron detector can be a micro-structured diode (e.g., a PIN diode or PN diode), in which cavities are etched in the semiconductor substrate. The cavities can have any suitable type of geometry (e.g., trench, circular hole, square hole, triangular hole) and the cavities can have all the same type of geometry, the cavities can exhibit different types of geometry from other cavities of the diode, some cavities can share geometry with some other cavities and have different geometry from other cavities, or any combination thereof. The cavities can be filled with the enriched boron or boron-containing materials, which can be a powder (e.g., a $^{10}$B powder). The substrate with the filled cavities can then be thermally treated for the solid-state diffusion of boron into the semiconductor (e.g., silicon or germanium) substrate, giving a continuous, conformal conductive layer, all over the exposed surfaces of the cavities. The cavities can be microstructures with a depth of 60 micrometers (μm) or less). The boron (e.g., $^{10}$B) filling can act as neutron conversion for the boron (e.g., $^{10}$B) transmutation reaction to occur, releasing alpha particles that are then sensed by the diode (e.g., PIN diode or PN diode). The boron can also be used as source for the solid-state diffusion of boron into silicon, to achieve conformal doping of the micro-structured diodes, thereby greatly enhancing the neutron detection efficiency of the device. Though boron is discussed extensively herein as the p-type dopant, this is for exemplary purposes only and should not be construed as limiting. Other p-type dopants can be used.

When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

Three-dimensional (3D) micro-structured semiconductor detectors have shown the potential to be highly efficient solid state thermal neutron detectors. These micro-structured detectors can be, for example, reverse-biased PIN diodes with cavities etched therein, followed by backfilling of a neutron conversion material to enable the diode to detect neutrons. In embodiments of the subject invention, the neutron conversion material can be boron (or a boron-containing material), such as $^{10}$B (or a $^{10}$B-containing material), and the same material can be used as a boron source for conformal doping, increasing the neutron detection efficiency of the device.

Figure 1:
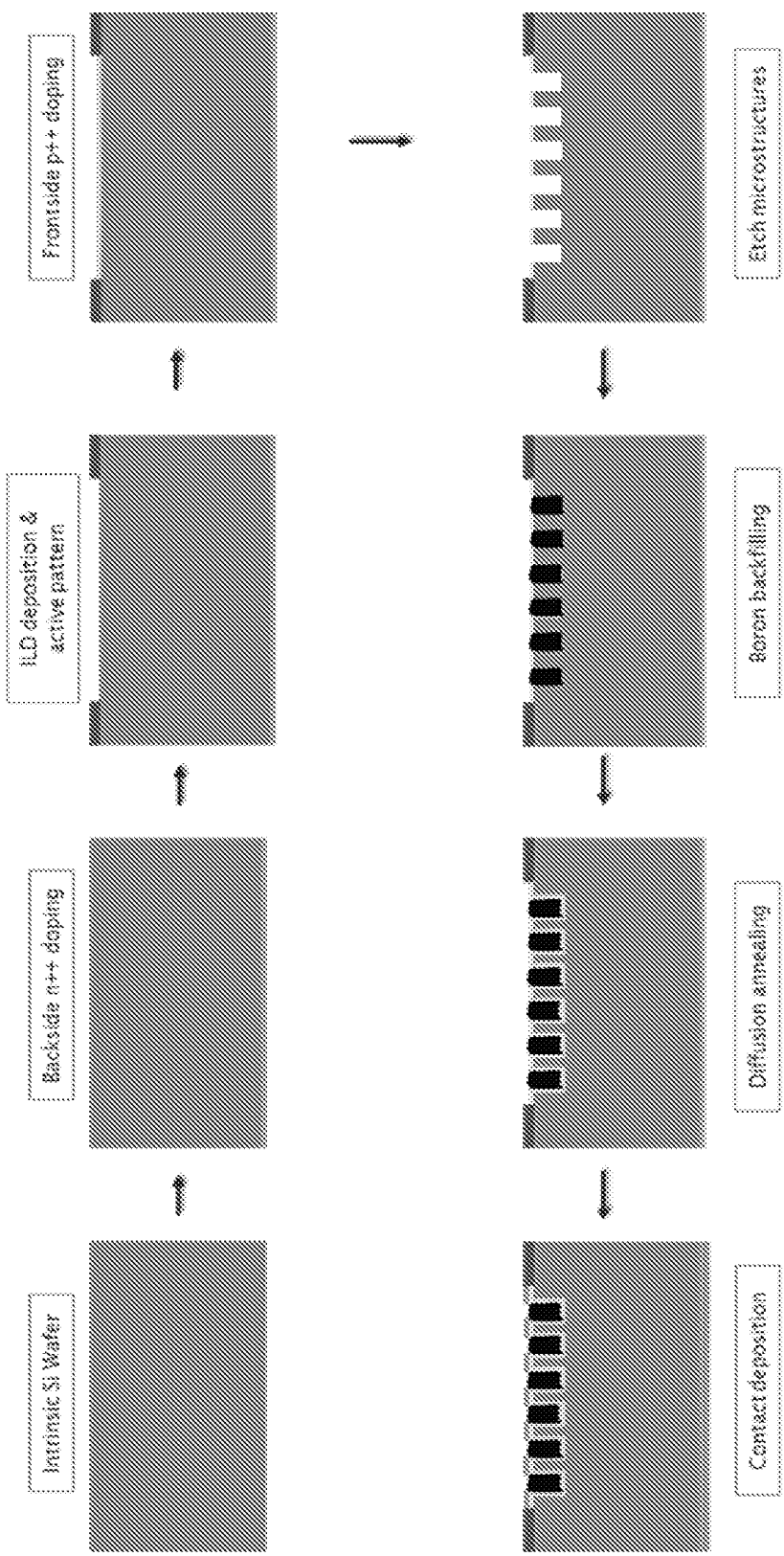
FIG. 1 shows a process flow for a method of fabricating a neutron detector, according to an embodiment of the subject invention.
Figure 9:
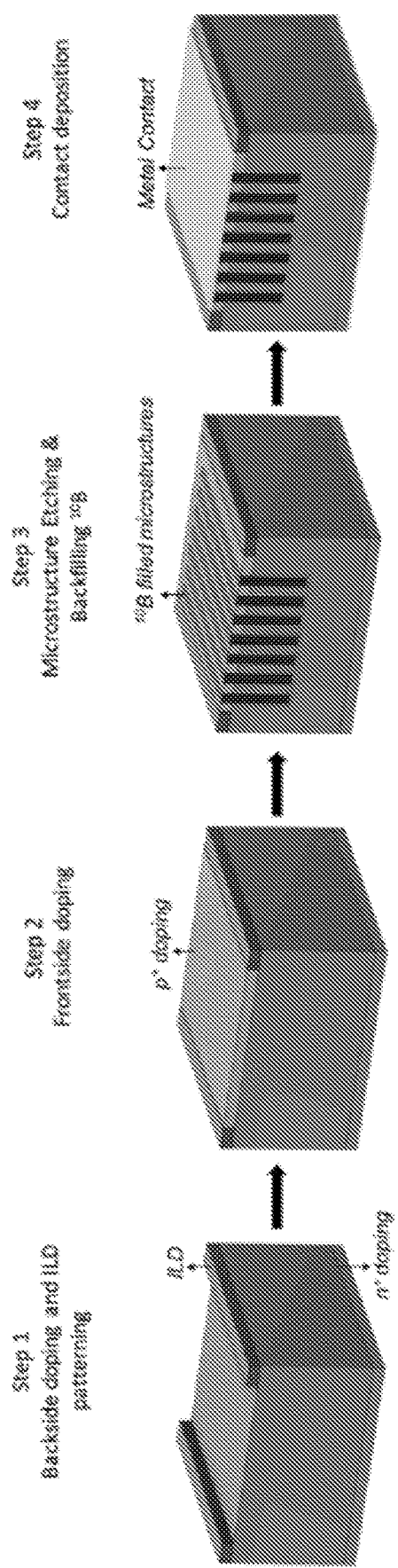
FIG. 9 shows a process flow for a method of fabricating a neutron detector, according to an embodiment of the subject invention.

FIG. 1 shows a process flow for a method of fabricating a neutron detector, according to an embodiment of the subject invention. FIG. 9 also shows a process flow for fabricating a neutron detector. Referring to FIGS. 1 and 9, n (e.g., n+ or n++) doping can be performed on a first surface of a semiconductor substrate (e.g., on the "backside" of the substrate). Though FIG. 1 indicates the semiconductor substrate is an intrinsic silicon wafer, this is for exemplary purposes only, and any suitable semiconductor substrate can be used (e.g., germanium or even n-type or p-type silicon). Next, a deposition is performed (e.g., insulating layer dielectric (ILD)) to leave the active pattern exposed on a second surface of the semiconductor substrate opposite from the first surface (e.g., on the "front side" of the substrate). Then, p (e.g., p+ or p++) doping can be performed on the active pattern/area. Microstructures can then be etched in the second surface (e.g., front side) of the substrate, and boron backfilling can be performed in the microstructures. Next, diffusion annealing can be performed on the substrate such that the backfilled boron diffuses into the substrate. Electrical contacts can be respectively deposited on the first and second surfaces (e.g., backside and front side) of the substrate. The doping source of the p doping can be boron (or a boron-containing material), such as $^{10}$B (or a $^{10}$B-containing material), and this can be the same material that is used for the boron backfilling.

The p doping can be done by any suitable method known in the art, for example spin-on-glass doping. The n doping can be by any suitable method known in the art, for example solid state diffusion. Phosphorous and/or lithium can be used as the dopant for the n doping, though embodiments are not limited thereto. During the etching of the microstructures, any suitable etching method known in the art can be used; for example, a thin layer of metal can be used as a hard mask to create a pattern, and the microstructures can be etched by a dry etch process (e.g., reactive ion etching (RIE)) or a wet etching process. The backfilling can be done by any suitable method known in the art, for example by centrifuging or sedimentation. The diffusion annealing can be performed to diffuse the boron on to the sidewalls of the etched microstructures. The electrical contacts can be made of any suitable material known in the art, for example aluminum-silicon (Al—Si) ohmic contacts; and can be deposited using any suitable method known in the art, for example by sputtering.

In a particular embodiment, a neutron detector can be fabricated using a silicon wafer (e.g., a 525-micron float zone silicon wafer with a resistivity of greater than 10 kΩ-cm). The entire backside of the wafer can be doped with phosphorus and/or lithium by, for example, solid state diffusion. The front side of the wafer can then be pattered to open the active area and can then be doped with boron (e.g., $^{10}B$) by spin-on-glass doping. A thin layer of metal can be used as a hard mask to create a pattern and etch the microstructures by a dry etch process. The hard mask can be removed after etching the microstructures, and then the microstructures can be backfilled with boron (e.g., $^{10}B$) by centrifuging. Another diffusion anneal can be performed to diffuse centrifuged boron on to the sidewalls of the etched microstructures. Last, Al—Si ohmic contacts can be deposited on both the front side and backside of the wafer by sputtering to complete the PIN diode.

Micro-structured silicon diodes advantageously increase neutron detection efficiency as the microstructures increase the active detection area. Related art devices use very deep trenches (>>60 μm deep) that are filled with lithium fluoride acting as a neutron conversion layer. In embodiments of the subject invention, shallow cavities (e.g., ≤60 μm deep) filled with boron (e.g., $^{10}B$) show high detection efficiency, comparable to that of much deeper trenches. FIG. 2a shows the neutron detection efficiency when using a planar PIN diode compared to that of a micro-structured diode with 40-micron deep circular cavities of 8-micron diameter (according to an embodiment of the subject invention). Referring to FIG. 2a, the efficiency of the diode of an embodiment of the subject invention is over 3.5 times greater than that of the planar diode.

Figures 3A, 3B:
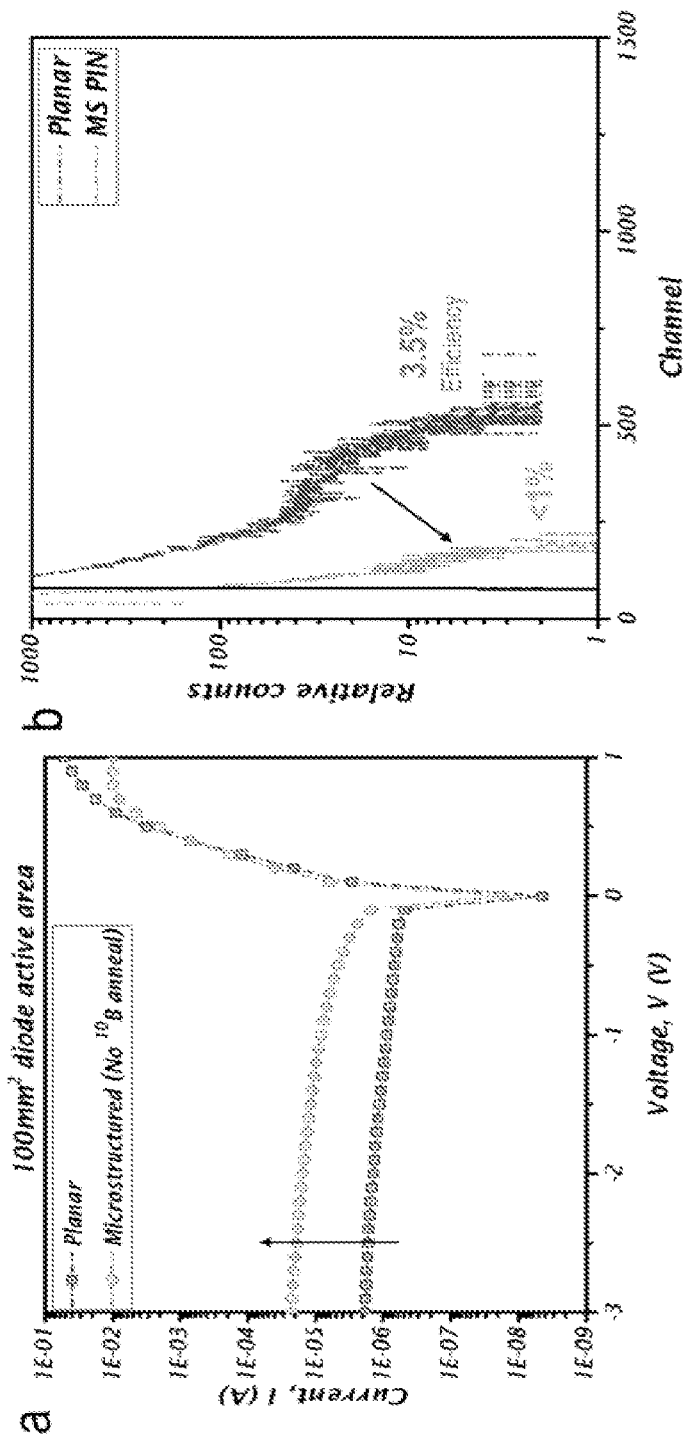
FIG. 3a is a plot of current (in amps (A)) versus voltage (in Volts (V)) showing the leakage current in a planar diode and a micro-structured diode with a boron-10 ($^{10}B$) anneal but without conformal doping. The diode active area in both cases is 100 square millimeters ($mm^2$). The curve with the higher current (circular data points) is for the micro-structured diode.
FIG. 3b is a plot of relative counts versus channel, showing a comparison of thermal neutron detection by a planar PIN diode and a micro-structured diode filled with $^{10}B$, but without conformal doping. The curve with the higher count values is for the planar diode (3.5% efficiency, compared to <1% for the micro-structured diode with no conformal doping).

When RIE is used to create the microstructures, surface damage can result from the RIE process, negatively impacting the diode performance and detection efficiency. Neutron detection is performed by sensing the change in the diode current under reverse bias. Hence, PIN diodes must have a leakage current (i.e., current under reverse bias) that is as low as possible. Damage due to the etching process and the presence of dangling bonds in the now-exposed substrate surface (e.g., silicon substrate surface) can increase the leakage current of a micro-structured diode, in turn reducing the detection efficiency. FIG. 3a is a plot of current (in amps (A)) versus voltage (in Volts (V)) showing the leakage current in a planar diode and a micro-structured diode with a $^{10}B$ anneal but without conformal doping. The diode active area in both cases is 100 square millimeters ($mm^2$). FIG. 3b is a plot of relative counts versus channel, showing a comparison of thermal neutron detection by a planar PIN diode and a micro-structured diode with a $^{10}B$ anneal but without conformal doping. Referring to FIGS. 3a and 3b, the planar diode has a detection efficiency that is more than 3.5 times higher than that of the micro-structured diode with no conformal doping.

Figures 4A, 4B:
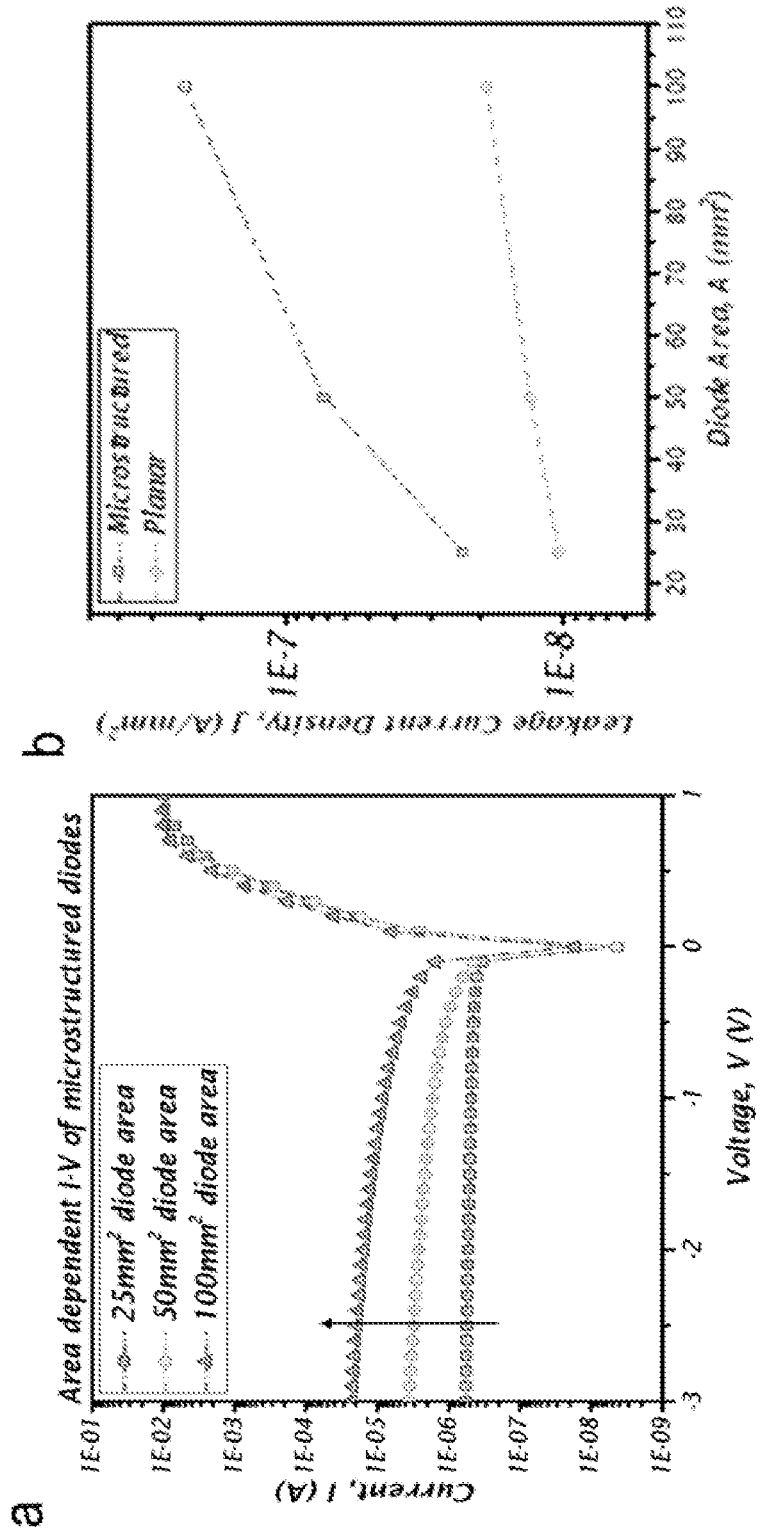
FIG. 4a is a plot of current (in A) versus voltage (in V) showing the leakage current of micro-structured diodes of different diode area. The curve with the highest values (triangular data points) is for a diode area of 100 $mm^2$; the curve with the middle value (circular data points) is for a diode of 50 $mm^2$; and the curve with the lowest values (square data points) is for a diode area of 25 $mm^2$.
FIG. 4b is a plot of leakage current density (in $A/mm^2$) versus diode area (in $mm^2$) for a planar diode and a micro-structured diode. The curve with the higher values (square data points) is for the micro-structured diode, and the curve with the lower values (circular data points) is for the planar diode.
Figures 5A, 5B, 5C, 5D:
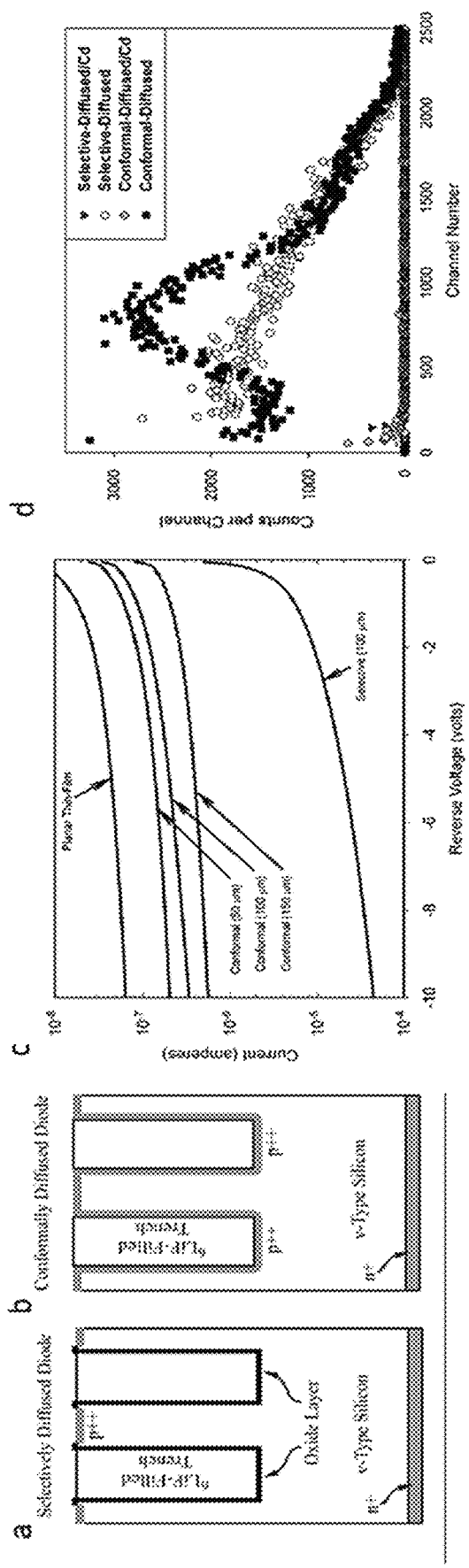
FIG. 5a shows a cross-sectional view of a selectively diffused diode with an oxide layer.
FIG. 5b shows a cross-sectional view of conformal doping.
FIG. 5c shows a plot of leakage current (in A) versus reverse voltage (in V) for different diodes.
FIG. 5d shows a plot of neutron detection for different diodes.

The negative impact of etching the microstructures is even more noticeable as the diode area increases. Surface defects add on as the detection area increases, and a higher leakage current is observed. This can be seen in FIGS. 4a and 4b, the former of which shows the current-voltage (I-V) characteristics of fabricated diodes of 25 $mm^2$, 50 $mm^2$, and 100 $mm^2$ area after the microstructures have been etched in the PIN structure. Even though leakage current observed in the 25 $mm^2$ diode doesn't significantly impact neutron detection efficiency, diodes of a much larger area may be needed for detectors to monitor special nuclear materials over large areas (e.g., urban networks, port of entry detectors, mobile units, and handheld detectors). FIGS. 5a and 5b show ways to lower leakage current on micro-structured diodes, and FIGS. 5c and 5d show I-V characteristics and neutron detection of diodes using these techniques ([8]).

Methods used to help reduce the leakage current (i.e., passivating the defects created during the etching process) include thermal oxidation, oxide layer coating, and conformal doping. In thermal oxidation, a thin layer of silicon dioxide ($SiO_2$) is thermally grown on the exposed silicon surface by forcing an oxidizing agent to diffuse into the substrate at high temperature and react with it. Conformal growth is achieved as the oxidizing agent is in the vapor phase, going all around and inside the cavities. In oxide layer coating, a conformal coating technique, such as atomic layer deposition (ALD) or plasma-enhanced chemical vapor deposition (PECVD), is used to deposit a thin oxide layer. In conformal doping, the side wall of the microstructures are diffused to form a conformal PN junction that will passivate the etch damage in the exposed silicon surface. Referring to FIGS. 5c and 5d, conformal doping gives the best results.

Figures 6A, 6B:
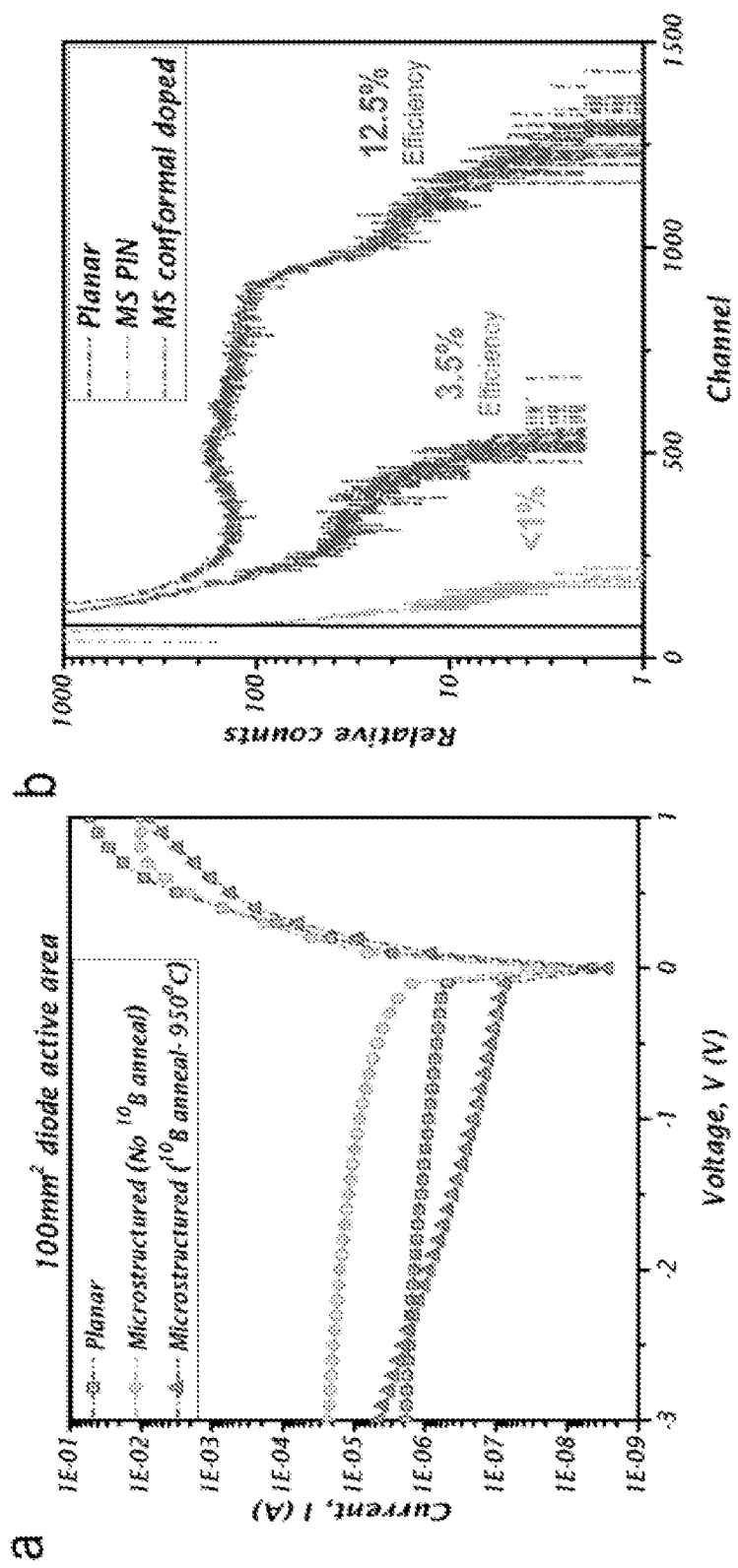
FIG. 6a is a plot of current (in A) versus voltage (in V) showing the leakage current of a planar diode, a micro-structured diode with no $^{10}B$ anneal, and a micro-structured diode with a $^{10}B$ anneal (at 950° C.). The diode active area for all diodes is 100 $mm^2$. The curve with the highest value at −1 V (circular data points) is for the micro-structured diode with no anneal; the curve with the middle value at −1 V (square data points) is for the planar diode; and the curve with the lowest value at −1 V (triangular data points) is for the micro-structured diode with a $^{10}B$ anneal.
FIG. 6b is a plot of relative counts versus channel, showing a comparison of thermal neutron detection (using a $^{252}Cf$ source) by a planar diode, a micro-structured PIN diode, and a micro-structured diode that has been conformally doped. The curve with the highest count values is for the micro-structured diode that has been conformally doped (12.5% efficiency); the curve with the middle values is for the planar diode (3.5% efficiency); and the curve with the lowest values is for the micro-structured PIN diode with no conformal doping (<1% efficiency).

In embodiments of the subject invention, conformal doping can be achieved in an extremely convenient manner by the solid-sate diffusion of boron into the substrate (e.g., silicon). The boron (e.g., $^{10}B$) filling is not only used as the neutron conversion layer, but also as a boron source for the conformal doping of the substrate (e.g., silicon). The conformal doping both passivates the damaged surface and creates a conductive layer all over the cavities to have a much better field distribution. FIG. 6a shows the I-V characteristics of a 100 $mm^2$ active area diode after the $^{10}B$ filling process and post fabrication anneal, and FIG. 6b shows the neutron detection curves. Leakage current significantly decreases, and thermal neutron detection efficiency significantly increases with the boron conformal doping.

Figure 7:
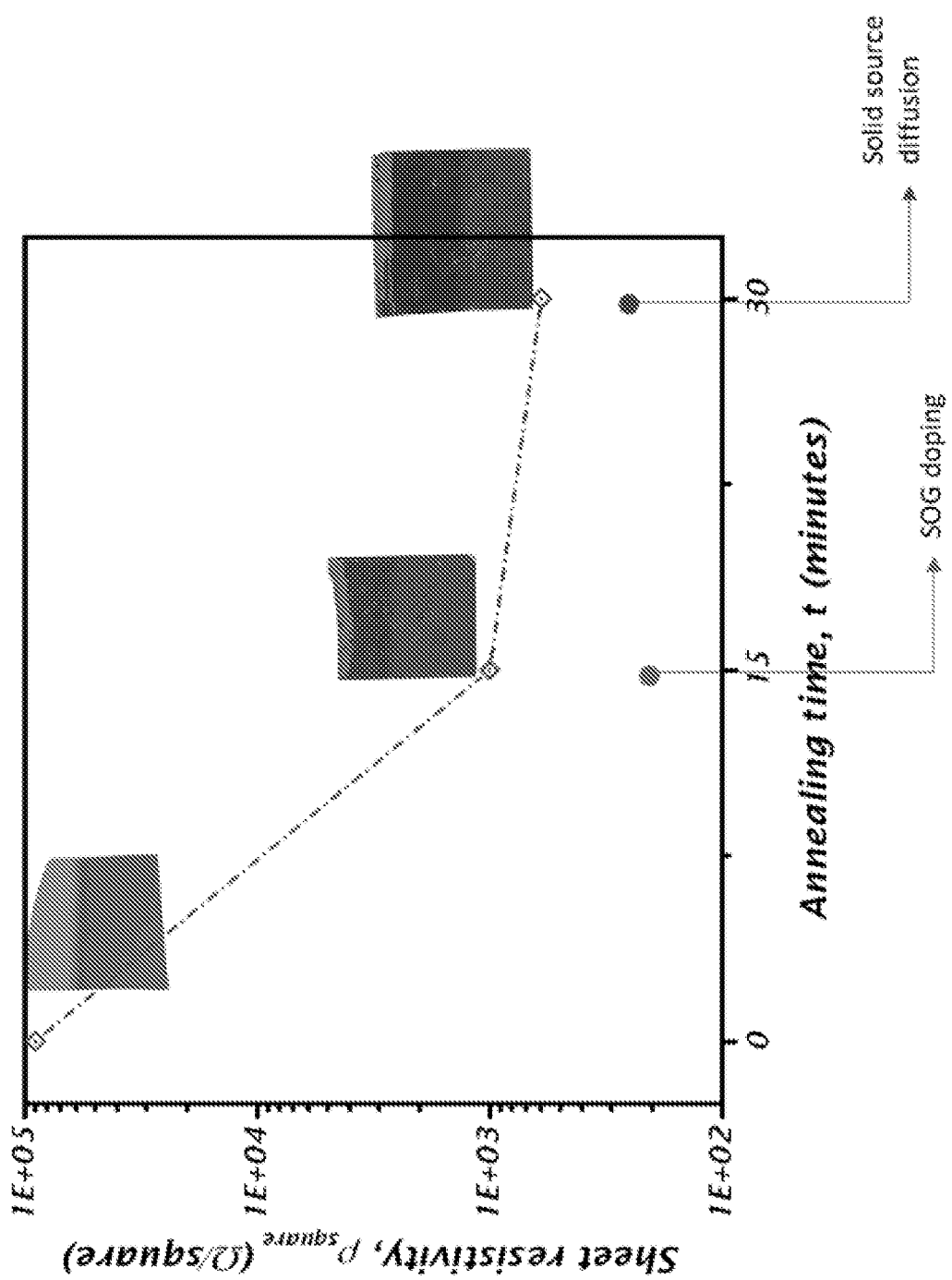
FIG. 7 is a plot of sheet resistance or resistivity (in Ohms per square (Ω/square)) versus annealing time (in minutes), showing resistance of the substrate (e.g., silicon) after a $^{10}B$ filling and annealing process.

FIG. 7 is a plot of sheet resistance or resistivity (in Ohms per square (Ω/square)) versus annealing time (in minutes), showing resistance of the substrate (e.g., silicon) after a $^{10}B$ filling and annealing process. Referring to FIG. 7, boron diffusion into the substrate (e.g., silicon) is confirmed by the sheet resistance of the substrate after the thermal treatment. The $^{10}B$ layer has been carefully removed to access the substrate surface to obtain the results of FIG. 7.

Figure 8B:
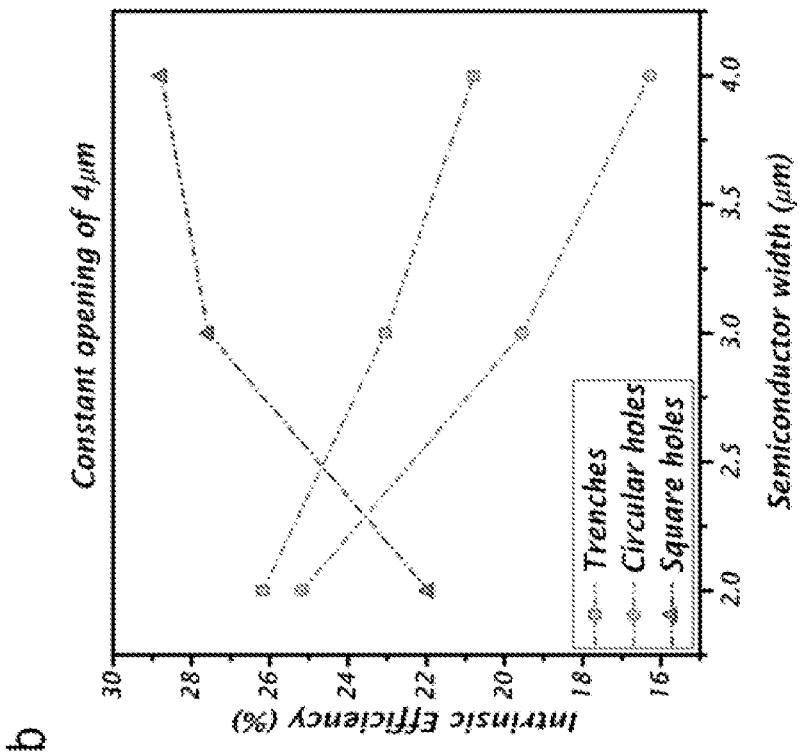
FIG. 8b shows a plot of intrinsic efficiency (in %) versus semiconductor width (in μm) for different shape openings of 4-μm wide openings. The curve with the highest value at 3.0 μm (triangular data points) is for square holes; the curve with the middle value at 3.0 μm (square data points) is for trenches; and the curve with the lowest value (circular data points) at 3.0 μm is for circular holes.
Figure 8A:
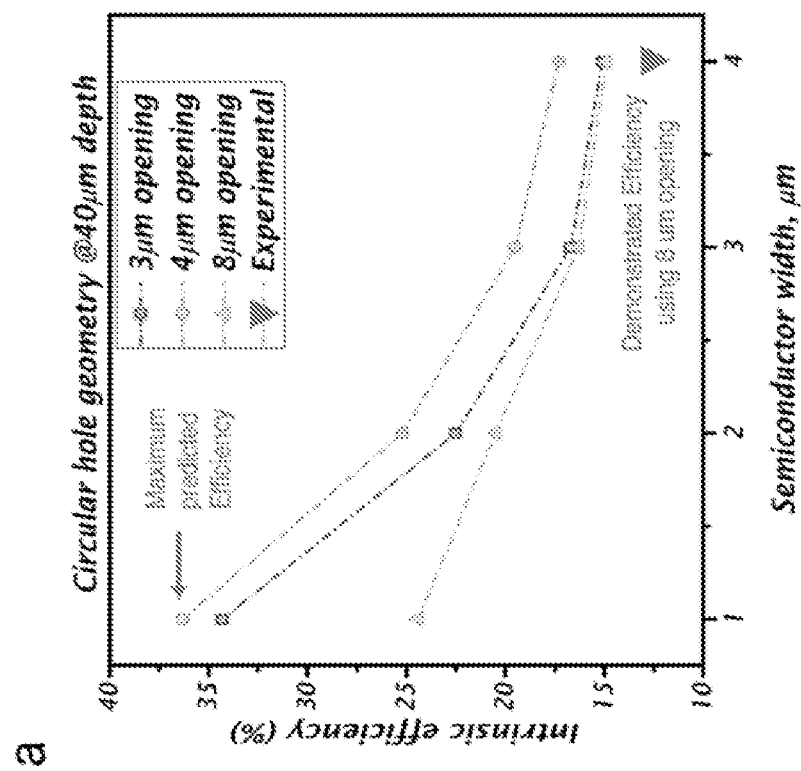
FIG. 8a is a plot of intrinsic efficiency (in %) versus semiconductor width (in micrometers (μm)) for different size openings of microstructures in a micro-structured diode. Each size microstructure had circular hole geometry with a depth of 40 μm. The curve with the highest values (circular data points) is for a 4-μm opening; the curve with the middle values (square data points) is for a 3-μm opening; and the curve with the lowest values (triangular data points) is for an 8-μm opening. The large triangle at the bottom-right of the plot shows the experimentally obtained intrinsic efficiency using an 8-μm opening.

Any geometry, width/diameter, and depth (up to 60 μm) can be used for the microstructures. FIGS. 8a and 8b show results for different opening diameters (FIG. 8a) and geometries (FIG. 8b). A neutron detection efficiency of up to 37% has been achieved in a simulation by using different geometries and sizes.

Embodiments of the subject invention utilize a boron filling material as a neutron conversion layer and also as a boron source for conformal doping. Shallow microstructures (up to 500 μm deep (e.g., up to 60 μm deep)) can be used while still achieving high thermal neutron detection efficiency compared to related art devices. Devices and methods of embodiments of the subject invention are simple and cost effective while conformally doping semiconductor (e.g., silicon) microstructures.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to the invention.

EXAMPLE 1

A neutron detector was fabricated using prime grade single-sided polished n-type float zone wafers with a resistivity >10,000 Ω-cm as substrates. A standard oxide strip using the buffered oxide etch (BOE) was performed on the as-received wafers before a protective thermal oxide layer, which acts as a diffusion mask during subsequent steps, was grown at 1000° C. for 90 minutes. The oxide on the backside of the wafer was stripped using the BOE while protecting the oxide on the front side. A well-known RCA clean was performed on the wafers to remove any organic materials, particulates, or trace metals right before doping the backside of the wafer. The sample was then quickly transferred to the phosphorus doping furnace in which solid state diffusion was performed at 950° C. for 30 minutes to form a n++ layer with high conductivity on the entire backside of the wafer. After diffusion, the thin glass layer formed during diffusion and the thermal oxide grown in the previous step were removed using BOE until hydrophobicity on the wafers was visually confirmed. A piranha clean followed by hydrofluoric acid (HF) strip was done to remove any organic residues left from the previous steps. Immediately following the clean, another insulating layer dielectric (ILD) stack was developed and acted as a diffusion mask during front side doping while protecting the doped backside until needed. The first layer of ILD was an oxide thermally grown at 1000° C. for 40 minutes, followed by the deposition of a second layer, silicon nitride, by low pressure chemical vapor deposition (LP-CVD). S1813 photoresist was used to pattern the front side of the wafer to open the diffusion window. The ILD stack in the diffusion window was removed using RIE followed by an oxide strip using BOE until hydrophobicity was visually confirmed. The photoresist was then stripped and a second RCA clean was performed to prepare the wafer for the boron diffusion process.

A thin layer of Borofilm-100 spin-on-glass (SOG) dopant was coated on the cleaned wafers, which were then baked at 200° C. for 20 minutes to remove solvents. Then, the doping was done at 950° C. for 15 minutes to drive the boron dopant into the exposed silicon surface. The residual glass layer from the SOG was removed using BOE just as done previously on the other side of the wafer. A very thin layer of aluminum was deposited by e-beam evaporation and served as a hard mask during the deep silicon etch (DSE) process to etch microstructures. As done before, the patterns of the microstructures were created on aluminum using the S1813 photoresist. The photoresist was removed, and the microstructures were then etched using the regular DSE process with patterned aluminum as a hard mask. The aluminum hard mask was then removed after the etch and a piranha clean was performed to remove the polymer deposited during the DSE process followed by an HF clean. A pre-metal clean was performed right before metal deposition using BOE until hydrophobicity was seen. The wafers were immediately transferred to the sputter tool to deposit 300 nm of aluminum-silicon contacts. The base pressure was maintained at least at about $1\times10^{-7}$ Torr. A last lithography step using S1813 was performed to define the aluminum contacts in the active area by etching the aluminum using aluminum etchant at 40° C. The front side of the wafer was then protected using hard baked S1813 photoresist and the ILD stack on the backside of the wafer was removed as done previously. Once the hydrophobicity on the backside was observed, the photoresist on the front side was stripped off and then another pre-metal clean was performed on the backside before the contacts were deposited by sputtering. The contacts were then annealed at 430° C. in forming gas for 30 minutes as the final step in the fabrication process.

The I-V characteristics of the devices were measured using a Keithley 4200-SCS and HP 4284A precision LCR meter to measure capacitance-voltage (C-V) of the devices. For radiation detection, polonium-210 (Po-210) was used as an alpha source and californium-252 (Cf-252) was used as a neutron source. An Ortec 142A preamplifier was used to apply bias and for preamplification of the pulse generated by the radiation source and the pulse shaping was done using the Ortec 575 Shaping amplifier. Finally, an Ortec EASY-MCA-2K multi-channel analyzer was used to create bins where the pulses were counted.

Several different experiments were run to obtain I-V characteristics neutron detection results, and sheet resistance, with the results shown in FIGS. 2a, 3a, 3b, 4a, 4b, 6a, 6b, and 7. These results are discussed in detail above in the body of this application. FIGS. 8a and 8b show the results of a simulation that was run to simulate the intrinsic efficiency of diodes of embodiments of the subject invention with different opening diameters (circular hole geometry with 40 μm depth, FIG. 8a) and different geometries (with a constant opening width/diameter of 4 μm, FIG. 8b).

EXAMPLE 2

A neutron detector was fabricated using doping with $^{10}$B powder. A powder of $^{10}$B was suspended in ethanol and was dispersed on a planar silicon wafer and annealed at 950° C. The residual boron powders were removed after the annealing, and the surface was cleaned with HF to remove any thermal oxide grown during annealing. Because the silicon wafer was n-type, the $^{10}$B had to counter-dope the wafer first for p+ doping to occur.

Figure 10:
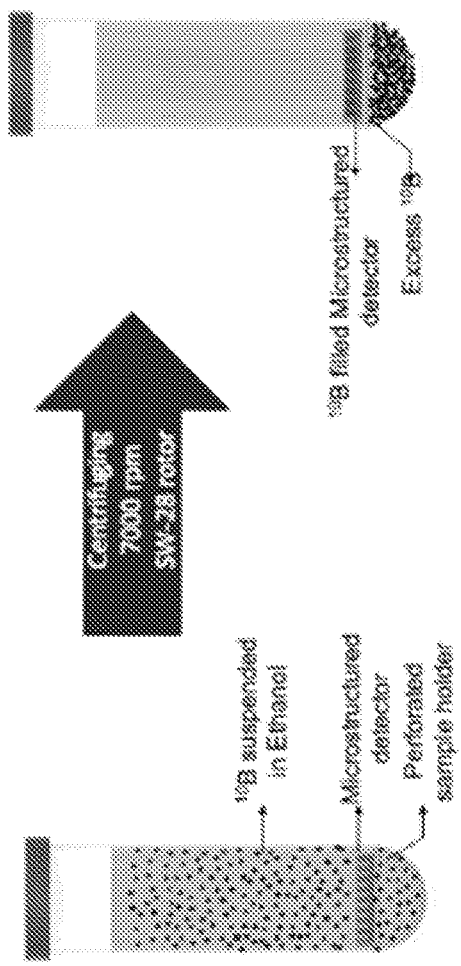
FIG. 10 shows a process flow for a centrifuging process to backfill $^{10}B$ in micro-structured diodes, according to an embodiment of the subject invention.
Figure 11:
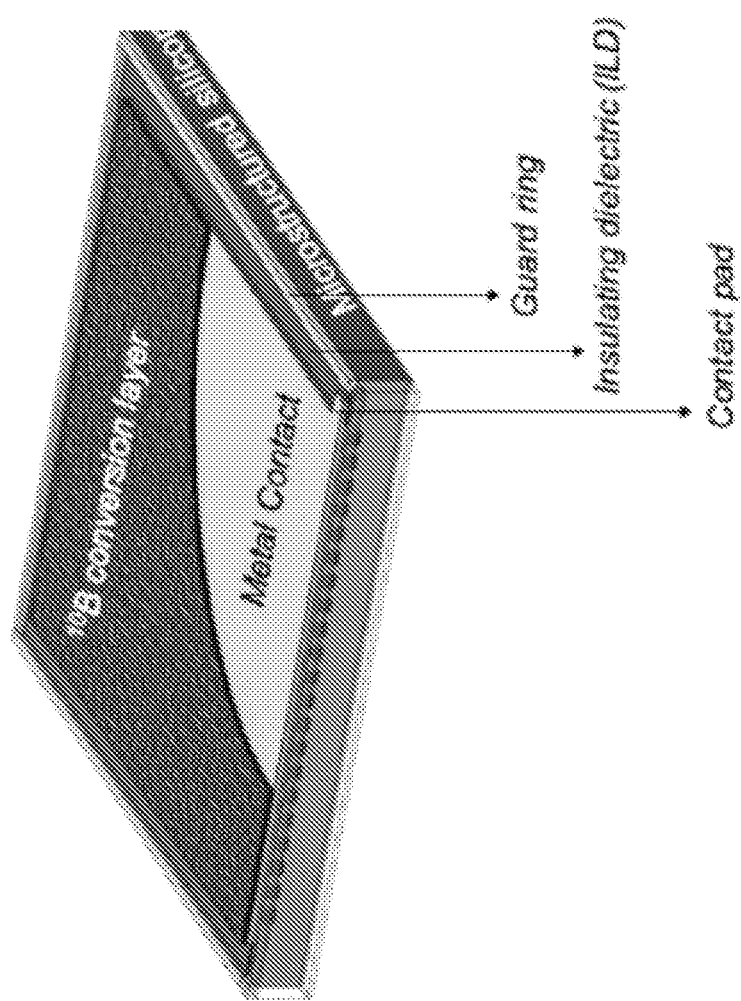
FIG. 11 shows a schematic of a fabricated micro-structured diode, according to an embodiment of the subject invention.

The diode fabrication process is shown in FIGS. 9, 10, and 11. Prime grade single sided polished n-type float zone wafers with resistivity of $>1\times10^4$ Ω-cm were used as the substrate. A thermal oxide layer, which acts as a diffusion mask during subsequent fabrication steps, of 200 nm thickness was grown. Any oxide on the backside of the wafer was removed using buffered oxide etch (BOE). An RCA clean was performed next to remove any organic materials, particulates, or trace metals. The substrate was immediately transferred for phosphorus doping using solid state diffusion. This forms a n+ layer with high conductivity on the backside of the wafer, as shown in step 1 in FIG. 9. A piranha clean followed by a hydrofluoric acid (HF) strip was done to remove any organic residues, and an insulating dielectric (ILD) stack was deposited. The ILD acts as diffusion barrier during front side doping, while protecting the backside of the wafer. The ILD stack includes a thermally grown 200 nm thick silicon oxide and a 50 nm low pressure chemical vapor deposition (LP-CVD) deposited silicon nitride. The front side of the wafer was then patterned to open the diffusion window in the dielectric stack (step 1) and a second RCA clean was performed to prepare the front side of the wafer for the boron diffusion process using a thin layer of the Borofilm-100 SOG dopant. After spinning the Borofilm, the wafers were annealed at 950° C. for 15 minutes to drive the boron dopants into the exposed silicon surface. This forms a p+ layer on the patterned front side of the wafer, as shown in step 2 of FIG. 9. Next, a thin layer of aluminum was deposited to serve as a hard mask for the deep silicon etch (DSE) process. Then, the microstructures were etched using a DSE process. The aluminum hard mask was removed after the DSE etch, and a piranha clean was performed to remove any polymer deposited during the DSE process.

Following the microstructure definition and etch, commercially available 99.9% pure enriched boron (96% $^{10}$B) with particle size of less than 5 μm (with most of them between 100 and 500 nm size) was used to fill the etched cavities. First, a suspension of $^{10}$B powders in ethanol was prepared to back-fill the microstructures using centrifugation. For the centrifugation process, the microstructured wafers (previously diced) were placed with the trenches facing up on a perforated sample holder at the bottom of the centrifuge tubes. The tubes were then filled with the ethanol-$^{10}$B suspension and spun at 7000 rpm in a Beckmann-Coulter ultra-centrifuge. This process drives the $^{10}$B powders from the suspension into the trenches of the microstructured wafer, as shown in FIG. 9 (step 3). The excess $^{10}$B powders are collected and reused. FIG. 10 shows schematically the filling process.

The $^{10}$B-filled microstructures were then annealed at 950° C. to achieve conformal doping in the trenches (step 3), as well as partial sintering, which further densifies the fill. This step was followed by a pre-metal clean using BOE and 300 nm aluminum-silicon (Al—Si) contact on the front side of the wafer. A final lithography step was performed to define the contacts in the active area by etching the Al—Si contacts. The final step in the fabrication process was the deposition of the backside contacts followed by annealing at 430° C. in forming gas (step 4 of FIG. 9). FIG. 11 shows a 200 mm$^2$ fully fabricated microstructured diode.

Figure 18:
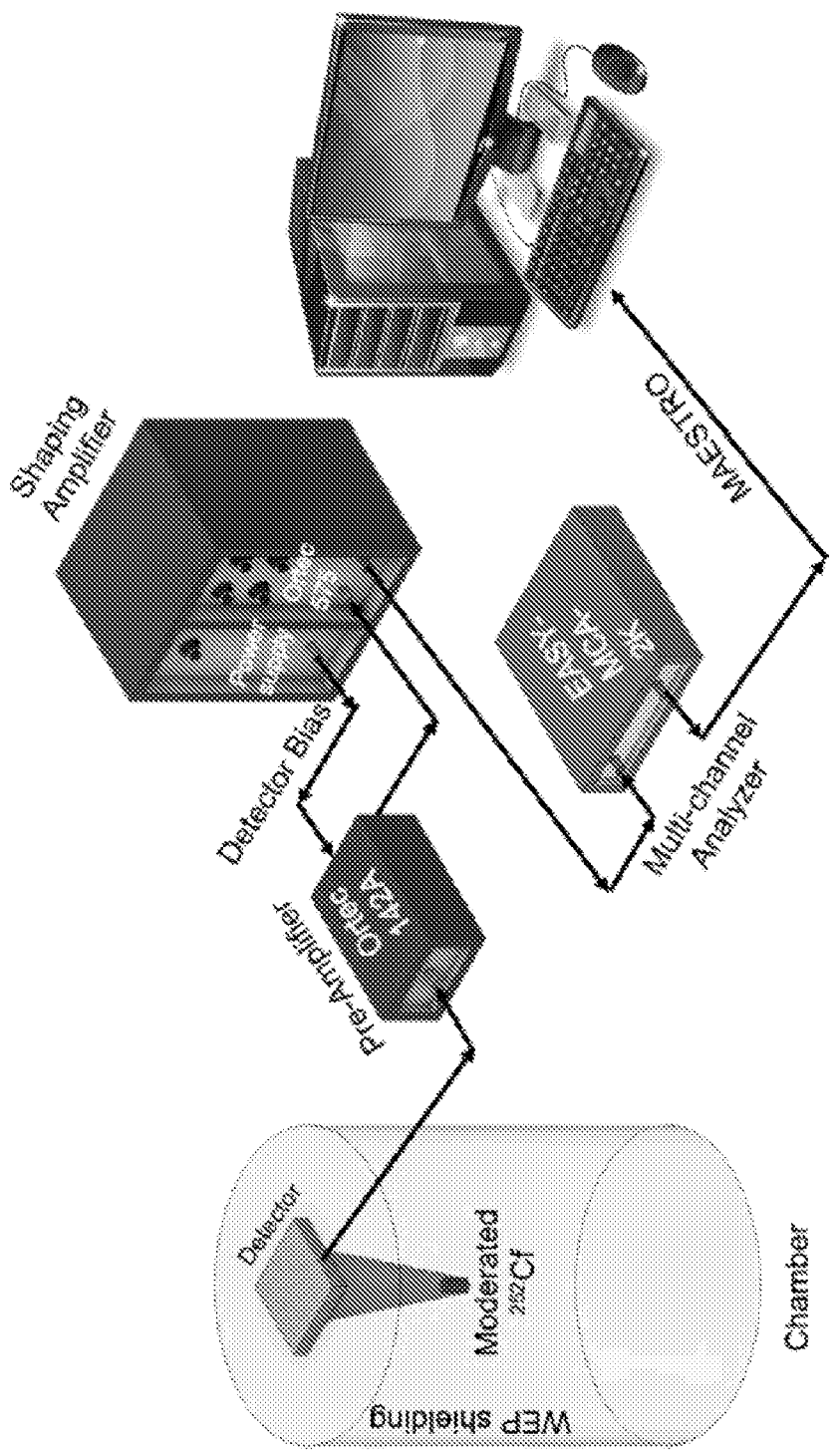
FIG. 18 shows a schematic view of a setup illustrating electronics used by microstructured detectors for neutron detection.

The schematic of the setup for testing is shown in FIG. 18. A moderated californium-252 ($^{252}$Cf) held in a water extended polyester shielding was used as a neutron source. The thermal neutron flux at the measurement position was 9900 thermal neutrons/mm$^2$/hour. An Ortec 142A preamplifier was used to apply bias to the diode and for pre-amplification of the pulse generated by the alphas in the diode. Pulse shaping was done in an Ortec 575 shaping amplifier. An Ortec EASY-MCA-2K multi-channel analyzer was used to measure the pulses/channel.

Figure 12:
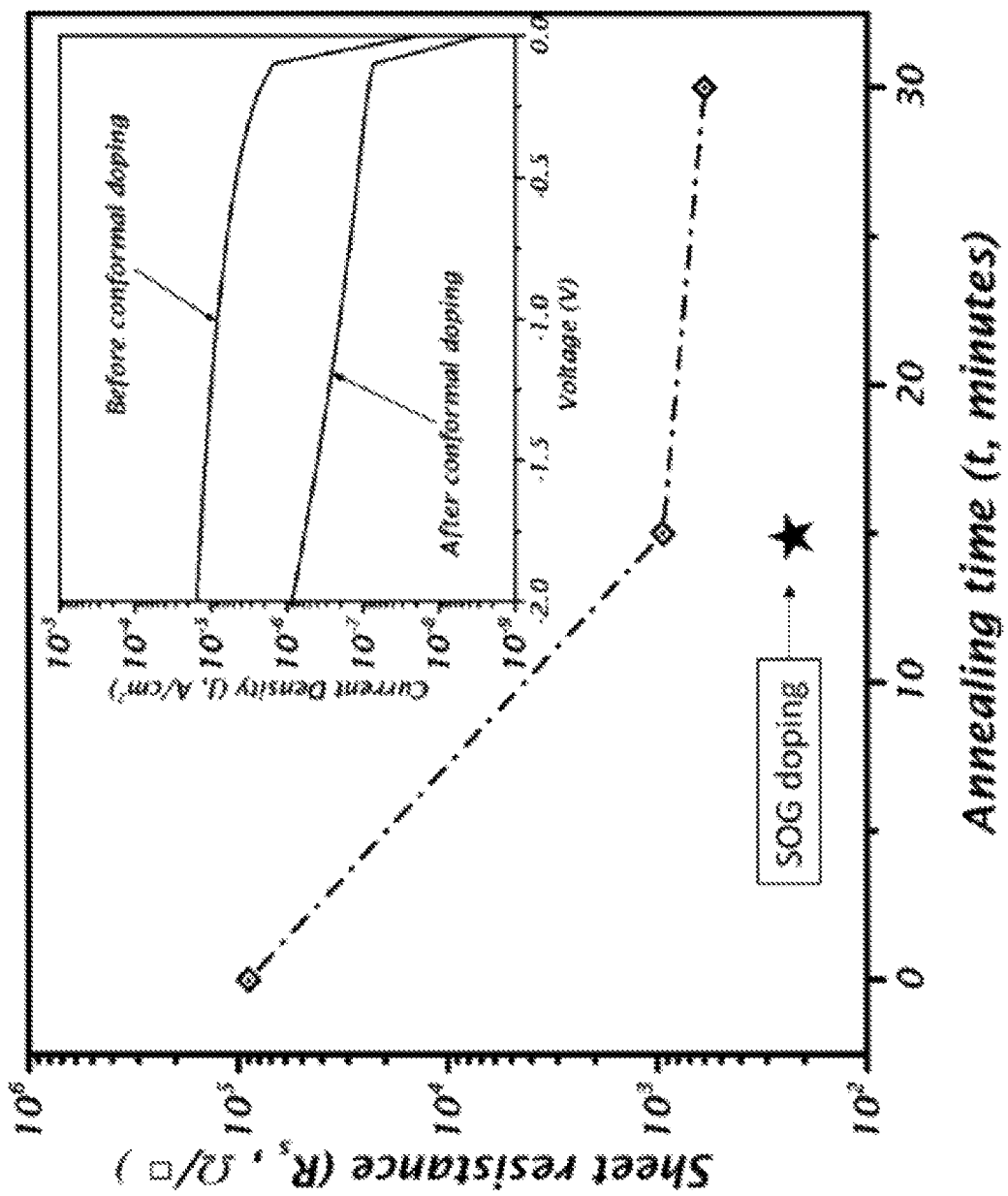
FIG. 12 shows a plot of sheet resistance ($R_s$, in Ω/square) versus annealing time (t, in minutes), showing the effects of doping using isotopically enriched 10B in intrinsic silicon where annealing time of 0 minutes refers to the sheet resistance of the substrate (about $10^5$ Ω/square). The inset is a plot of voltage (in V) versus current density (in amps per square centimeter (A/cm$^2$)), showing the effects on the diode leakage current before and after diffusion as a result of annealing.

FIG. 12 shows that the $^{10}$B solution successfully doped the silicon after annealing and effectively decreased the sheet resistance from about 10$^5$ Ω/square to about 8×10$^2$ Ω/square. This result is comparable with the sheet resistance (about 2×10$^2$ Ω/square) typically achieved using a conventional spin-on-glass (SOG) technique and represented with a star symbol in FIG. 12. The decrease in sheet resistance proves that the $^{10}$B doping increased the doping concentration while changing the silicon from n-type to p-type by counter doping. The doping concentration saturated after annealing for 15 minutes. This diffusion also resulted in a continuous p+-n junction in the microstructured diode, as demonstrated from the reduction in leakage current density for undoped and doped microstructured diodes, respectively. This is shown in the inset in FIG. 12. The lower leakage current indicated a reduction of surface states from the etch damage during trench formation. This lower leakage current achieved by the conformal doping is key to achieving higher neutron detection efficiencies.

EXAMPLE 3

Two basic microstructure designs were considered and compared as the geometry for neutron detection, using Monte Carlo nuclear particle (MCNP) simulation—(a) circular holes and (b) trenches.

The expected thermal neutron detection efficiency for micro-structured diodes was initially simulated using the MCNP code (v6.2) (see also Werner, MCNP User's Manual-Code Version 6.2; Los Alamos National Laboratory, Report LA-UR-17-29981, 2017; and Werner et al., MCNP6.2 Release Notes, Los Alamos National Laboratory, Report LA-UR-18-20808, 2018; both of which are hereby incorporated herein by reference in their entireties). The neutron capture ion algorithm was used to study the neutron capture in the $^{10}$B film according to the reaction $^{10}$B(n,α)$^7$Li. The pulse height tally tool of MCNP was then used to determine the charge deposited by the alpha particles in the bulk of the diodes.

Figure 13:
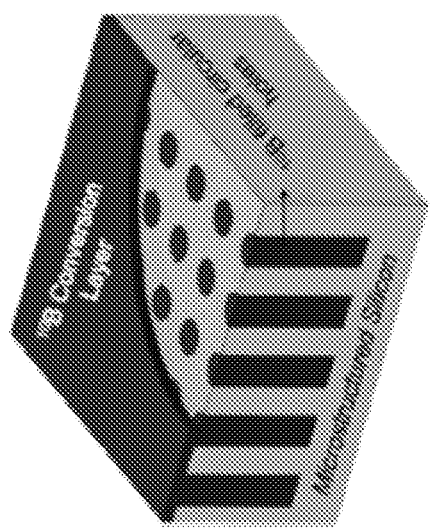
FIG. 13 shows a schematic view of a thermal neutron detector, according to an embodiment of the subject invention. Though $^{10}$B and silicon are listed as the materials of the p-type dopant and the substrate, respectively, these are for exemplary purposes only and should not be construed as limiting.
Figure 14:
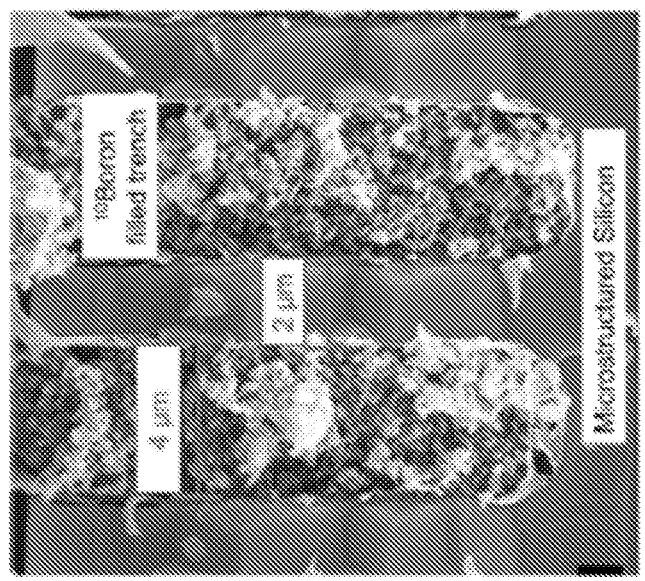
FIG. 14 shows a scanning electron microscope image of a cross-section of narrow trenches compactly packed with $^{10}$B by centrifuging method, according to an embodiment of the subject invention.
Figure 15:
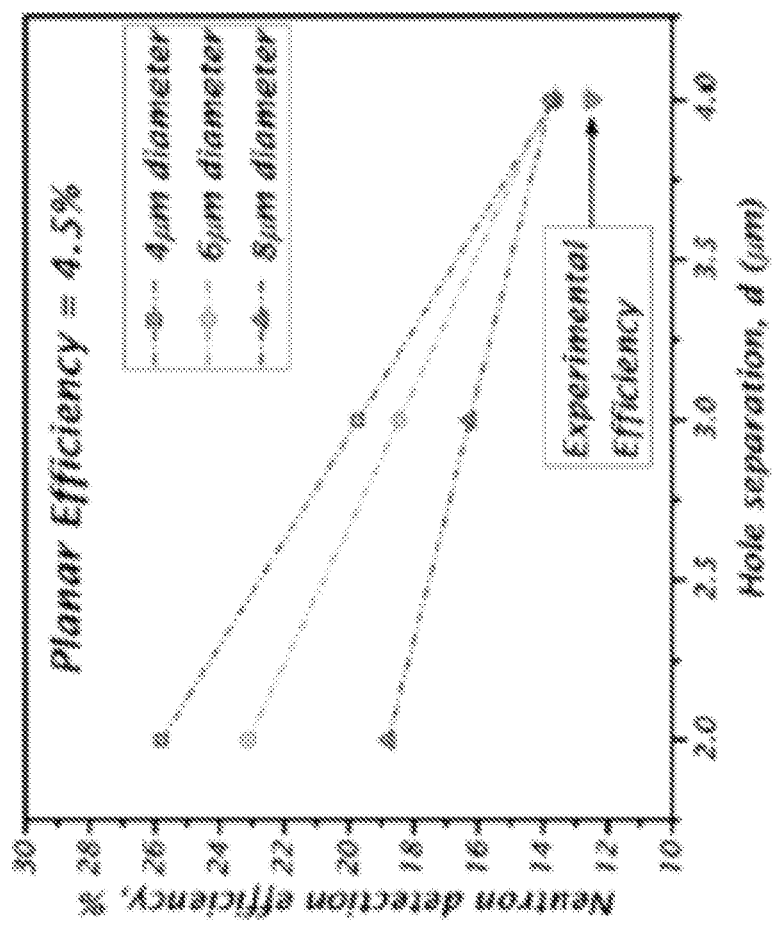
FIG. 15 shows a plot of hole separation (in micrometers (μm)) versus neutron detection efficiency (in %), showing results of a Monte Carlo simulation for micro-structured detectors with circular holes of various diameters. The curve with the triangular data points is for a diameter of 8 μm; the curve with the circular data points is for a diameter of 6 μm; and the curve with the square data points is for a diameter of 4 μm.

The schematic geometry of the detector used for this analysis is shown in FIG. 13. The circular hole geometry was chosen for the simulation and experimental study because of its potential physical robustness. The circular geometry included a 3 μm thick layer of $^{10}$B on the top of the diodes in addition to the $^{10}$B filled microstructures. FIG. 14 shows a scanning electron microscope (SEM) cross-section image of the $^{10}$B-filled microstructures. The microstructure depth was kept constant at 40 μm because about 90% of the thermal neutrons are captured at this depth (or within this depth). The hole diameter and the spacing were changed, and the results are shown in FIG. 15. For 4 μm hole spacing, the efficiency was about 13% with the effect from the hole diameter. However, efficiencies of up to 26% can be obtained when decreasing the hole spacing to 2 μm. The efficiency appeared to be inversely proportional to the hole diameter because larger diameters result in more alpha particles being captured in the $^{10}$B layer before reaching the semiconductor. This is directly related to the about 3 μm range of the alpha particle in the $^{10}$B conversion material. Thus, by reducing the hole diameter and spacing, the probability of the charged particle reaching the space charge region in the silicon increases, resulting in higher neutron detection efficiency.

EXAMPLE 4

Figure 16:
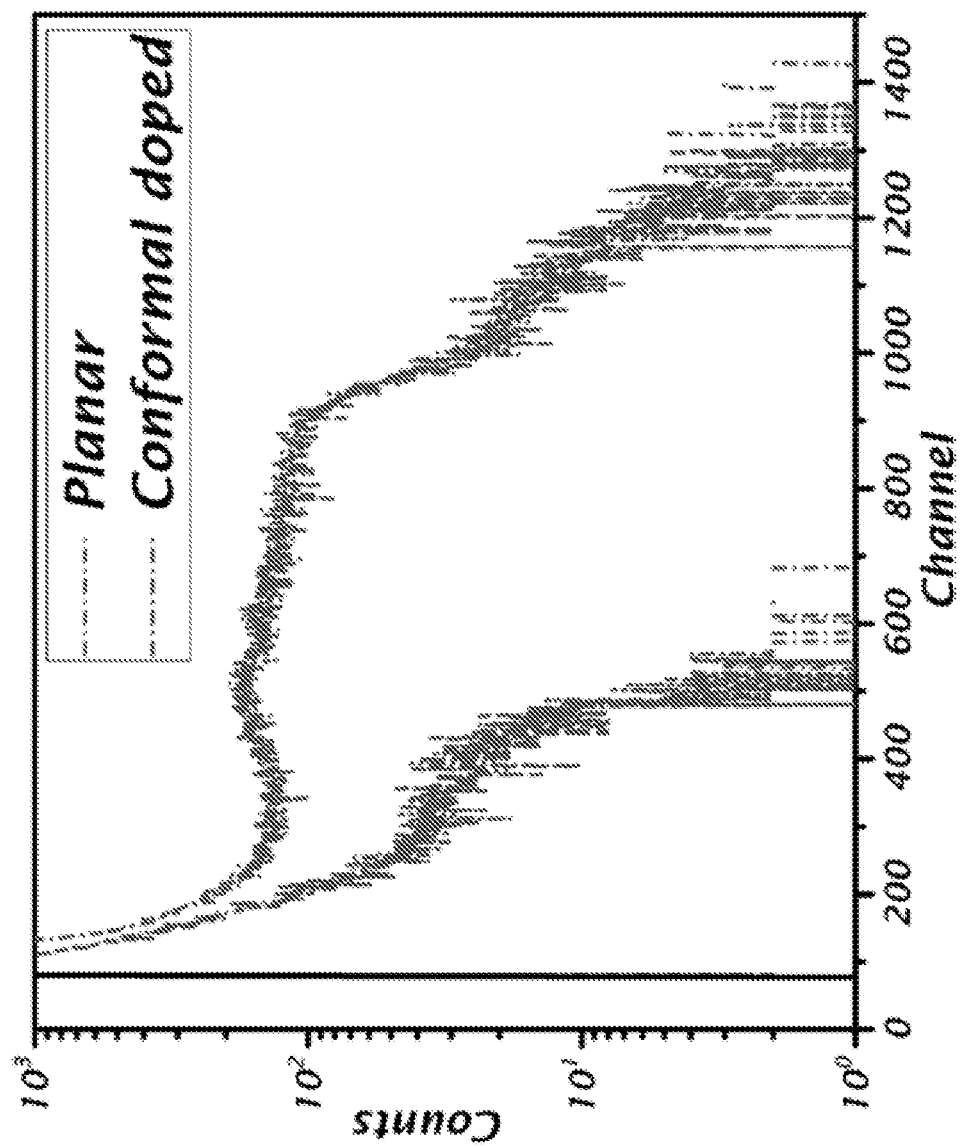
FIG. 16 shows a plot of relative counts versus channel, showing a comparison of thermal neutron detection by a planar diode and a micro-structured diode (circular hole design) that has been conformally doped. The curve with the highest count values is for the micro-structured diode that has been conformally doped (12.5% efficiency); the curve with the lowest count values is for the planar diode (3.5% efficiency).

The thermal neutron detection efficiency for both planar and microstructured diodes (according to an embodiment of the subject invention) with a 200 mm$^2$ area was measured using a $^{252}$Cf source moderated with high density polyethylene. The detector was aligned vertically in a dark stainless-steel chamber under vacuum at 15 cm from the neutron source. The thermal neutron flux (9900 neutrons/mm$^2$/h) at this position was determined using a calibrated neutron detector, with 30% efficiency, prior to conducting the measurements. The intrinsic thermal neutron detection efficiency for the planar detector fabricated using the same process flow was about 3.5% at 300 keV lower lever discriminator. The conformal doping enhances the probability of charges reaching the depletion region of the diode before recombining and increases the thermal neutron detection efficiency up to 12.5% (FIG. 16). The conformal doping process is used to eliminate the etch damage on the side walls of the microstructures while creating a continuous p+ layer that results in better thermal neutron detection efficiency. This is in good agreement with the MCNP simulations, as shown in FIG. 15. The increase in the total number of counts with respect to the channel in the 200 mm$^2$ microstructured detectors when compared to the planar detectors of the same area is shown in FIG. 16. The results show that conformal doping in microstructured detector increases the thermal neutron detection efficiency. The increased efficiency is because of the larger active area in conformally doped diodes, when compared to planar detectors. Likewise, the presence of a larger amount of $^{10}$B in the microstructured detector increases the probability of neutron interaction. The combination of these two effects results in higher neutron detection efficiency in conformally doped microstructured detectors when compared to planar detectors.

It can be seen that the incorporation of conformally doped sidewalls in the circular hole microstructure design results in substantial improvement over the planar detectors. The lower efficiency of detectors with hole design compared with trenches is because of the relatively lower amount of $^{10}$B in the holes compared to that in the trenches for a given dimension.

EXAMPLE 5

Figure 17:
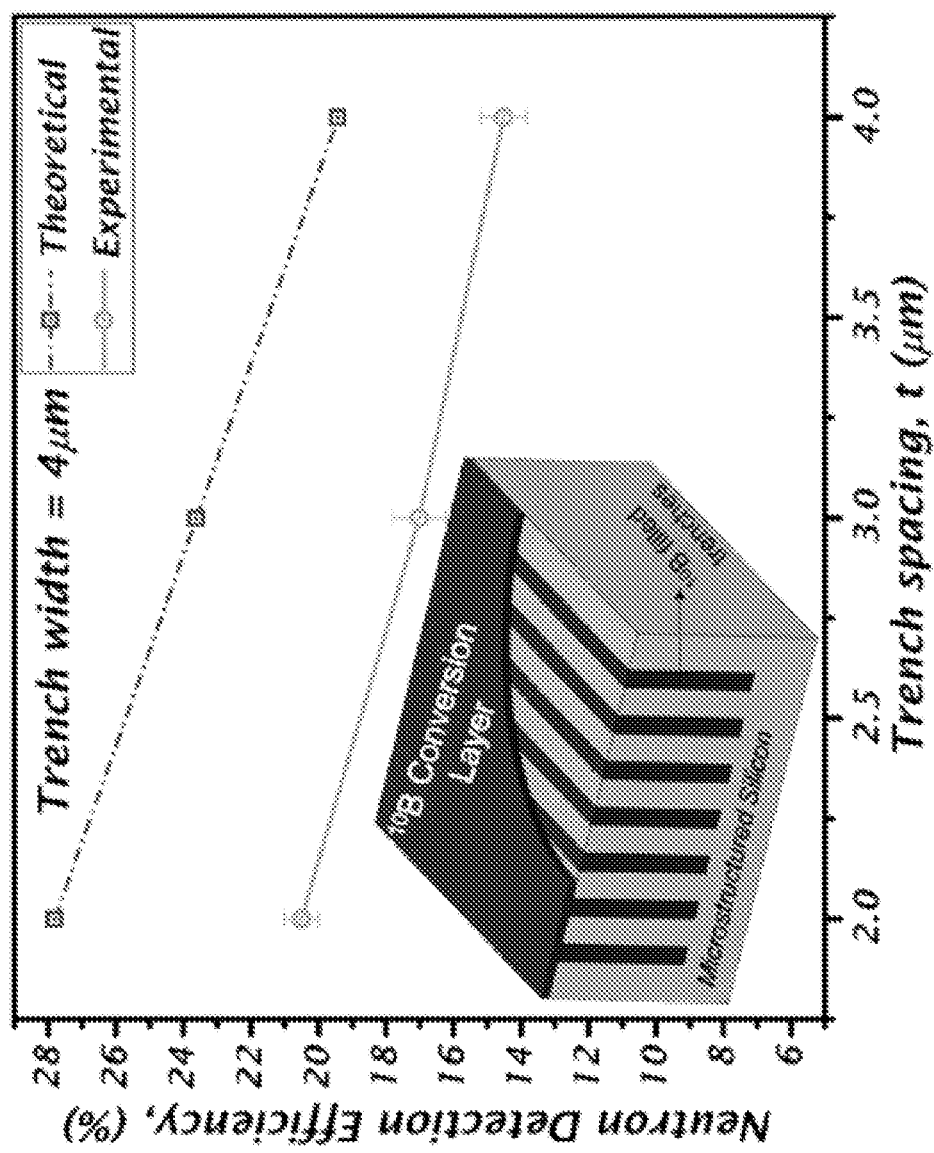
FIG. 17 shows a plot of neutron detection efficiency (in %) versus trench spacing (in μm), showing a comparison between theoretically simulated and experimental efficiencies of the microstructured neutron detectors with trench design. The geometry of the detector is shown in the inset. The curve with the circular data points is for the experimental results; and the curve with the square data points is for the theoretical data points.

The neutron detection efficiency for devices with trench microstructures at a constant trench width of 4 µm was tested, with the results shown in FIG. 17. The experimental efficiency increases from about 14% to 21% by reducing the spacing between the trenches from 4 µm to 2 µm. The reduction in spacing between the trenches to 2 µm allows the detector to have more $^{10}$B compared to those with trenches spaced 4 µm. In addition, silicon requires about 1.3 µm thickness to capture the alphas generated in the $^{10}$B. Therefore, 2 µm spacing between the trenches is enough to completely absorb the energy deposited by the alphas. This enables more neutrons to interact with the neutron conversion material resulting in increased neutron detection efficiency.

The efficiencies from the experimental results follow the same trend as the MCNP-simulated efficiencies, as shown in FIG. 17. When compared to the MCNP-simulated efficiency, the experimental efficiency is within 15% and 25% in the detectors with circular hole and trench geometry, respectively. This discrepancy in intrinsic thermal neutron detection efficiency arises from the difference in the filling density of $^{10}$B in the microstructures. The filling density of $^{10}$B in simulated microstructures was assumed to be 100%. That is like having a solid block of material with 100% microstructure filling to give us the maximum possible conversion efficiency. However, achieving such a perfect fill with $^{10}$B powdered particles in the experiments is not realistic.

Overall, the dual use of isotopically enriched $^{10}$B powder as a neutron conversion material and source for conformal doping was demonstrated. The experimental results validated the thermal neutron detection efficiency predicted using MCNP simulations. The improved efficiency of microstructured diodes is because of the diffusion of back-filled $^{10}$B into the semiconductor resulting in conformal doping of the sidewalls and improved charge collection. Further evidence for conformal doping was demonstrated by the decrease in leakage current in the microstructured diodes.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] G. Knoll, Radiation Detection and Measurement, Third. John Wiley & Sons, Ltd., 2000.

[2] W. Price, Nuclear Radiation Detection, 2nd ed. McGraw Hill, New York, 1964.

[3] N. Tsoulfanidis, Measurement and Detection of Radiation, 2nd ed. Taylor and Francis, New York, 1995.

[4] D. S. McGregor, M. D. Hammig, Y. H. Yang, H. K. Gersch, and R. T. Klann, "Design considerations for thin film coated semiconductor thermal neutron detectors—I: Basics regarding alpha particle emitting neutron reactive films," Nucl. Instruments Methods Phys. Res. Sect. A Accel. Spectrometers, Detect. Assoc. Equip., vol. 500, no. 1-3, pp. 272-308, 2003.

[5] A. N. Caruso, "The physics of solid-state neutron detector materials and geometries.," J. Phys. Condens. Matter, vol. 22, no. 44, p. 443201, 2010.

[6] R. G. Fronk et al., "Microstructured Semiconductor Neutron Detectors (MSND) and Instrumentation."

[7] R. G. Fronk, "Dual-side etched microstructured semiconductor neutron detectors, an abstract of a dissertation," 2011.

[8] D. S. McGregor, S. L. Bellinger, and J. Kenneth Shultis, "Present status of microstructured semiconductor neutron detectors," J. Cryst. Growth, vol. 379, pp. 99-110, 2013.

[9] T. C. Unruh, D. S. McGregor, J. K. Shultis, W. J. McNeil, and S. L. Bellinger, "Microstructured semiconductor neutron detectors," Nucl. Instruments Methods Phys. Res. Sect. A Accel. Spectrometers, Detect. Assoc. Equip., vol. 608, no. 1, pp. 125-131, 2009.

[10] J. K. Shultis and D. S. Mcgregor, "Design and performance considerations for perforated semiconductor thermal-neutron detectors," 2009.

[11] Runkle, R. C.; Bernstein, A.; Vanier, P. E. Securing special nuclear material: Recent advances in neutron detection and their role in nonproliferation. J. Appl. Phys. 2010, 108, 111101.

[12] Ahmed, S. N. Physics and Engineering of Radiation Detection, $2^{nd}$ ed.; Elsevier B. V., 2015; pp 137-143.

[13] Oed, A. Detectors for thermal neutrons. Nucl. Instrum. Methods Phys. Res., Sect. A 2004, 525, 62-68.

[14] Kouzes, R. T.; Ely, J. H.; Erikson, L. E.; Kernan, W. J.; Lintereur, A. T.; Siciliano, E. R.; Stephens, D. L.; Stromswold, D. C.; Van Ginhoven, R. M.; Woodring, M. L.; Woodring, M. L. Neutron detection alternatives to 3He for national security applications. Nucl. Instrum. Methods Phys. Res., Sect. A 2010, 623, 1035-1045.

[15] Rinard, P. Neutron Interactions with Matter. Technical Report; Los Alamos National Laboratory, NUREG/CR-5550, LA-UR-90-732, 1991.

[16] Shao, Q.; Voss, L. F.; Conway, A. M.; Nikolic, R. J.; Dar, M. A.; Cheung, C. L. High aspect ratio composite structures with 48.5% thermal neutron detection efficiency. Appl. Phys. Lett 2013, 102, 063505.

[17] Murphy, J. W.; Kunnen, G. R.; Mejia, I.; Quevedo-Lopez, M. A.; Allee, D.; Gnade, B.; Gnade, B. Optimizing diode thickness for thin-film solid state thermal neutron detectors. Appl. Phys. Lett. 2012, 101, 143506.

[18] Smith, L.; Murphy, J. W.; Kim, J.; Rozhdestvenskyy, S.; Mejia, I.; Park, H.; Allee, D. R.; Quevedo-Lopez, M.; Gnade, B. Thin film CdTe based neutron detectors with high thermal neutron efficiency and gamma rejection for security applications. Nucl. Instrum. Methods Phys. Res., Sect. A 2016, 838, 117-123.

[19] Nikolic, R. J.; Shao, Q.; Voss, L. F.; Conway, A. M.; Radev, R.; Wang, T. F.; Dar, M.; Deo, N.; Cheung, C. L.; Fabris, L.; Britton, C. L.; Ericson, M. N. Si Pillar Structured Thermal Neutron Detectors: Fabrication Challenges and Performance Expectations. SPIE Proceedings, LLNL-PROC-480809, 2011.

[20] Uher, J.; Fröjdh, C.; Jakubek, J.; Kenney, C.; Kohout, Z.; Linhart, V.; Parker, S.; Petersson, S.; Pospíšil, S.; Thungström, G. Characterization of 3D thermal neutron semiconductor detectors. Nucl. Instrum. Methods Phys. Res., Sect. A 2007, 576, 32-37.

[21] Nikolić, R. J.; Conway, A. M.; Reinhardt, C. E.; Graff, R. T.; Wang, T. F.; Deo, N.; Cheung, C. L. 6:1 aspect ratio silicon pillar based thermal neutron detector filled with. Appl. Phys. Lett. 2008, 93, 133502.

[22] Yu, B.; Zhao, K.; Yang, T.; Jiang, Y.; Fan, X.; Lu, M.; Han, J. Process effects on leakage current of Si-PIN neutron detectors with porous microstructure. Phys. Status Solidi 2017, 214, 1600900.

[23] McGregor, D. S.; McNeil, W. J.; Bellinger, S. L.; Unruh, T. C.; Shultis, J. K. Microstructured semiconductor neutron detectors. Nucl. Instrum. Methods Phys. Res., Sect. A 2009, 608, 125-131.

[24] Wu, J.-W.; Weltz, A.; Koirala, M.; Lu, J. J.-Q.; Dahal, R.; Danon, Y.; Bhat, I. B. Boron-10 nanoparticles filled silicon trenches for thermal neutron detection application. Appl. Phys. Lett. 2017, 110, 192105.

[25] Bellinger, S. L.; Fronk, R. G.; McNeil, W. J.; Sobering, T. J.; McGregor, D. S. Enhanced variant designs and characteristics of the microstructured solid-state neutron detector. Nucl. Instrum. Methods Phys. Res., Sect. A 2011, 652, 387-391.

[26] Bellinger, S. L.; Fronk, R. G.; McNeil, W. J.; Shultis, J. K.; Sobering, T. J.; McGregor, D. S. Characteristics of the Stacked Microstructured Solid State Neutron Detector. Proceedings of SPIE 7805, Hard X-Ray, Gamma-Ray, and Neutron Detector Physics XII, 2010, p 78050N.

[27] Fronk, R. G.; Bellinger, S. L.; Henson, L. C.; Ochs, T. R.; Smith, C. T.; Kenneth Shultis, J.; McGregor, D. S. Dual-sided microstructured semiconductor neutron detectors (DSMSNDs). Nucl. Instrum. Methods Phys. Res., Sect. A 2015, 804, 201-206.

[28] Dahal, R.; Huang, K. C.; Clinton, J.; Licausi, N.; Lu, J.-Q.; Danon, Y.; Bhat, I. Self-powered micro-structured solid state neutron detector with very low leakage current and high efficiency. Appl. Phys. Lett. 2012, 100, 243507.

[29] McGregor, D. S.; Kenneth Shultis, J. Reporting detection efficiency for semiconductor neutron detectors: A need for a standard. Nucl. Instrum. Methods Phys. Res., Sect. A 2011, 632, 167-174.

[30] Shultis, J. K.; Mcgregor, D. S. Design and performance considerations for perforated semiconductor thermal-neutron detectors. Nucl. Instrum. Methods Phys. Res., Sect. A 2009, 606, 608-636.

[31] MCNP Users Manual-Code Version 6.2; Werner, C. J., Ed.; Los Alamos National Laboratory, Report LA-UR-17-29981, 2017.

[32] Werner, C. J.; Bull, J. S.; Solomon, C. J. MCNP6.2 Release Notes, Los Alamos National Laboratory, Report LA-UR-18-20808, 2018.

What is claimed is:

1. A method of fabricating a thermal neutron detector, the method comprising:
performing n-type doping on a first surface of a semiconductor substrate;
depositing an insulating layer dielectric on a second surface of the semiconductor substrate to leave an active pattern exposed on the second surface, the second surface being opposite from the first surface;
performing p-type doping on the active pattern using a p-type dopant material;
etching microstructures in the active pattern;
backfilling the p-type dopant material in the microstructures; and
performing diffusion annealing on the semiconductor substrate having the p-type dopant material backfilled in the microstructures such that at least one element from the p-type dopant material diffuses into the semiconductor substrate,
wherein the p-type doping is conformal doping,
wherein the microstructures and portions of the second surface of the semiconductor substrate between the microstructures are free from the insulating layer dielectric, and
wherein the method further comprises depositing a first electrical contact on the first surface of the semiconductor substrate and a second electrical contact on the second surface of the semiconductor substrate.

2. The method according to claim 1, wherein the p-type dopant material comprises boron, and wherein the at least one element from the p-type dopant material comprises boron.

3. The method according to claim 1, wherein each microstructure of the microstructures etched in the second surface of the semiconductor substrate has a depth of 500 μm or less.

4. The method according to claim 1, wherein the n-type doping uses an n-type dopant material comprising at least one of phosphorous and lithium.

5. The method according to claim 1, wherein the p-type dopant material is a powder comprising boron.

6. The method according to claim 1, wherein the p-type dopant material comprises boron-10 ($^{10}$B).

7. The method according to claim 1, wherein the microstructures are etched in the active pattern using reactive ion etching (RIE).

8. The method according to claim 1, wherein the microstructures are etched in the active pattern using a wet etching process.

9. The method according to claim 1, wherein the p-type doping is performed by spin-on-glass doping, and
wherein the n-type doping is performed by solid state diffusion.

10. The method according to claim 1, wherein at least one microstructure of the microstructures etched in the active pattern has a circular hole geometry.

11. The method according to claim 1, wherein at least one microstructure of the microstructures etched in the active pattern has a square hole geometry.

12. The method according to claim 1, wherein at least one microstructure of the microstructures etched in the active pattern has a trench geometry.

13. The method according to claim 1, wherein each microstructure of the microstructures etched in the active pattern has a circular hole geometry with an opening radius of 4 μm and a depth of no more than 60 μm.

14. The method according to claim 1, wherein a thermal neutron detection efficiency of the fabricated thermal neutron detector is in a range of from 12.5% to 21%.

15. A method of fabricating a thermal neutron detector, the method comprising:
performing n-type doping on a first surface of a semiconductor substrate;
depositing an insulating layer dielectric on a second surface of the semiconductor substrate to leave an active pattern exposed on the second surface, the second surface being opposite from the first surface;
performing p-type doping on the active pattern using a p-type dopant material;
etching microstructures in the active pattern;

backfilling the p-type dopant material in the microstructures; and performing diffusion annealing on the semiconductor substrate having the p-type dopant material backfilled in the microstructures such that as least one element from the p-type dopant material diffuses into the semiconductor substrate, wherein the p-type doping is conformal doping, wherein the microstructures and portions of the second surface of the semiconductor substrate between the microstructures are free from the insulating layer dielectric, wherein each microstructure of the microstructures etched in the active pattern has a depth of 60 µm or less, wherein the method further comprises:
depositing a first electrical contact on the first surface of the semiconductor substrate and a second electrical contact on the second surface of the semiconductor substrate, wherein the p-type dopant material is a powder comprising $^{10}$B, wherein the microstructures are etched in the active pattern using RIE, and wherein at least one microstructure of the microstructures etched in the active pattern has a circular hole geometry, a square hole geometry, or a trench geometry.

16. A thermal neutron detector, comprising:
a semiconductor substrate comprising microstructures on an active pattern of a first surface of the semiconductor substrate and a conformal conductive layer in the microstructures, wherein the semiconductor substrate comprises:
an n-doped section formed by n-type doping on a second surface of the semiconductor substrate, the second surface being opposite from the first surface;
a p-doped section formed by p-type doping on the first surface of the semiconductor substrate using a p-type dopant material, the p-type doping being conformal doping; and
an insulating layer dielectric on the first surface of the semiconductor substrate, wherein the active pattern is exposed out of the insulating layer dielectric, such that the microstructures and portions of the first surface of the semiconductor substrate between the microstructures are free from the insulating layer dielectric, wherein the p-type dopant material is filled in the microstructures to give the conformal conductive layer, wherein diffusion annealing has been performed on the semiconductor substrate having the p-type dopant material backfilled in the microstructures such that at least one element from the p-type dopant material has diffused into the semiconductor substrate through sidewalls of the microstructures, wherein each microstructure of the microstructures in the first surface of the semiconductor substrate has a depth of 500 µm or less, and wherein the thermal neutron detector further comprises:
a first electrical contact on the first surface of the semiconductor substrate; and
a second electrical contact on the second surface of the semiconductor substrate.

17. The thermal neutron detector according to claim 16, wherein the p-type dopant material comprises boron, and wherein the at least one element from the p-type dopant material comprises boron.

18. The thermal neutron detector according to claim 16, wherein the p-type dopant material comprises $^{10}$B.

19. The thermal neutron detector according to claim 16, wherein at least one microstructure of the microstructures in the active pattern has a circular hole geometry, a square hole geometry, or a trench geometry.

20. The thermal neutron detector according to claim 16, wherein each microstructure of the microstructures in the active pattern has a circular hole geometry with an opening radius of 4 µm and a depth of no more than 60 µm.

21. The thermal neutron detector according to claim 16, wherein a thermal neutron detection efficiency of the thermal neutron detector is in a range of from 12.5% to 21%.

* * * * *